United States Patent
Barreto et al.

(10) Patent No.: US 11,032,367 B2
(45) Date of Patent: Jun. 8, 2021

(54) LONG UPLOAD TIME DETECTION AND MANAGEMENT

(71) Applicant: MICROSOFT TECHNOLOGY LICENSING, LLC, Redmond, WA (US)

(72) Inventors: Jose Araujo Barreto, Redmond, WA (US); Filip Chelarescu, Kirkland, WA (US); Andrew Keith Glover, Duvall, WA (US); John David Rodrigues, Woodinville, WA (US); Meir Elie Abergel, Seattle, WA (US); Steven J. Bailey, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 16/036,874

(22) Filed: Jul. 16, 2018

(65) Prior Publication Data
US 2020/0021650 A1    Jan. 16, 2020

(51) Int. Cl.
*H04L 29/08* (2006.01)
*G06F 1/3296* (2019.01)
*G06F 9/50* (2006.01)

(52) U.S. Cl.
CPC ........ *H04L 67/1095* (2013.01); *G06F 1/3296* (2013.01); *G06F 9/5011* (2013.01); *H04L 67/145* (2013.01); *H04L 67/32* (2013.01)

(58) Field of Classification Search
CPC ... H04L 67/1095; H04L 67/145; H04L 67/32; G06F 1/3296; G06F 9/5011
See application file for complete search history.

(56) References Cited

U.S. PATENT DOCUMENTS

| | | | |
|---|---|---|---|
| 6,185,247 B1 * | 2/2001 | Williams | H04J 3/0638 370/503 |
| 7,181,531 B2 | 2/2007 | Pinkerton et al. | |
| 7,260,100 B1 * | 8/2007 | Snodgrass | H04L 45/00 370/321 |
| 7,693,888 B2 * | 4/2010 | Urscheler | G06F 16/275 707/634 |
| 7,840,646 B2 | 11/2010 | Davis et al. | |

(Continued)

FOREIGN PATENT DOCUMENTS

CN    103036804 B    4/2013

OTHER PUBLICATIONS

"International Search Report and Written Opinion Issued in PCT Application No. PCT/US2019/037584", dated Aug. 29, 2019, 12 Pages.

(Continued)

*Primary Examiner* — Nasser M Goodarzi
*Assistant Examiner* — Adil Ocak
(74) *Attorney, Agent, or Firm* — NovoTechIP International PLLC

(57) ABSTRACT

A system and method for detection and management of atypical synchronization sessions of electronic content. The system is configured to determine whether a pending or ongoing synchronization session between a client device and cloud storage service is associated with a condition that will delay the synchronization process. The proposed system and method can significantly improve the ability of users to safeguard their documents as well as reduce the likelihood of data loss.

22 Claims, 14 Drawing Sheets

(56) References Cited

U.S. PATENT DOCUMENTS

| | | |
|---|---|---|
| 8,745,267 B2 | 6/2014 | Luecke et al. |
| 9,110,892 B2 | 8/2015 | Didcock et al. |
| 9,647,906 B2 | 5/2017 | Asenjo et al. |
| 2005/0044530 A1* | 2/2005 | Novik .................. H04L 29/06 717/122 |
| 2005/0055619 A1* | 3/2005 | Bedwani .............. G06F 11/277 714/752 |
| 2006/0080363 A1 | 4/2006 | Vadlamani et al. |
| 2008/0005188 A1 | 1/2008 | Li et al. |
| 2008/0189419 A1 | 8/2008 | Girle et al. |
| 2009/0300169 A1 | 12/2009 | Sagar et al. |
| 2012/0036277 A1 | 2/2012 | Stokking et al. |
| 2013/0138708 A1 | 5/2013 | Hamada et al. |
| 2014/0258703 A1 | 9/2014 | Vanturennout et al. |
| 2015/0112924 A1 | 4/2015 | Vanturennout et al. |
| 2015/0117576 A1* | 4/2015 | Yan ................... H04L 25/03821 375/348 |
| 2015/0180963 A1 | 6/2015 | Luecke et al. |
| 2015/0263909 A1* | 9/2015 | Okubo ................ H04L 43/0817 709/224 |
| 2016/0234303 A1 | 8/2016 | Liu |
| 2017/0364863 A1* | 12/2017 | Kessel ................ H04L 67/1095 |

OTHER PUBLICATIONS

"Best Practices for Google Cloud Storage", Retrieved from: https://web.archive.org/web/20150906114315/https:/cloud.google.com/storage/docs/best-practices, Sep. 6, 2015, 5 Pages.

Betts, et al., "Azure IoT Hub developer guide", Retrieved from: https://docs.microsoft.com/en-us/azure/iot-hub/iot-hub-devguide, Jan. 29, 2018, 2 Pages.

* cited by examiner

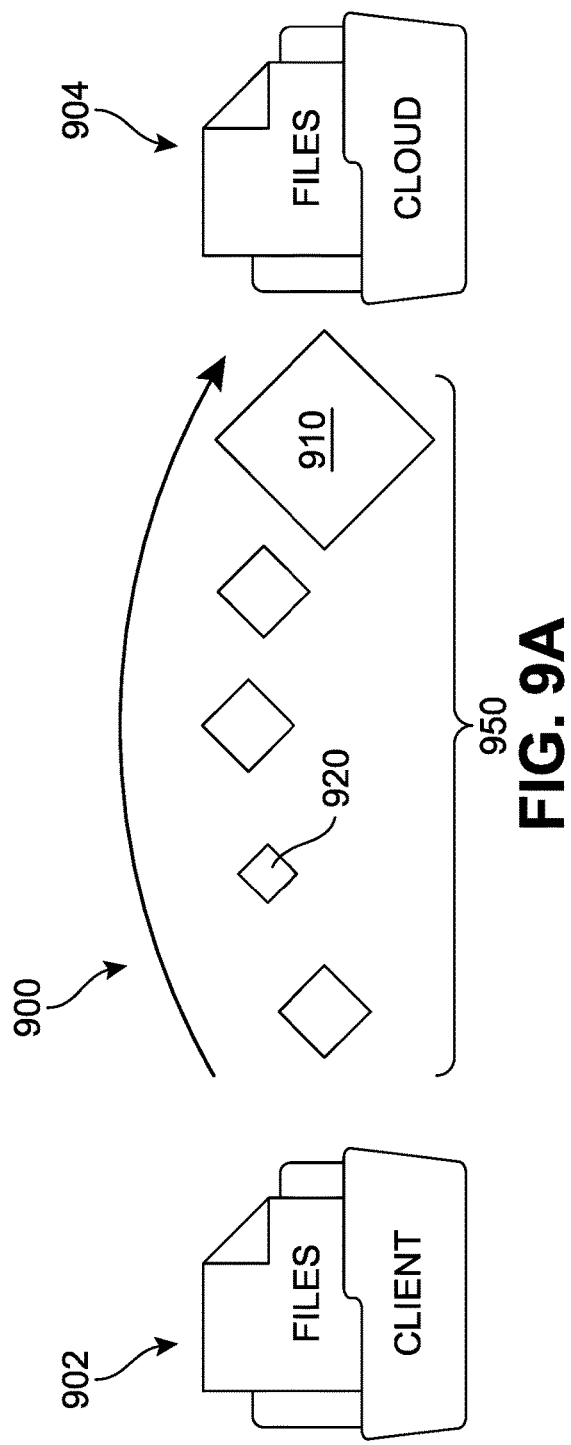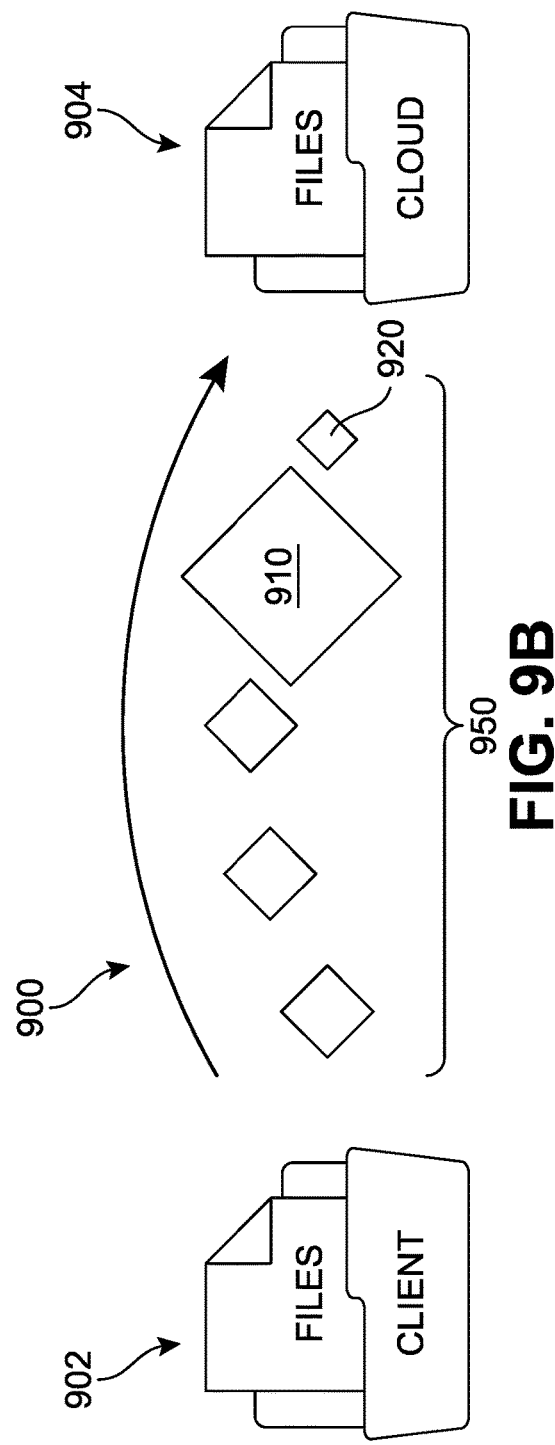

LONG UPLOAD TIME DETECTION AND MANAGEMENT

BACKGROUND

Cloud storage accounts allow users to store their electronic content items or files in an online storage account that can be accessed from any computing device with a network connection. Some more well-known examples of cloud storage service providers include Microsoft OneDrive®, Google Drive®, DropBox®, and Box®. Through these types of services, users can upload content items such as pictures, songs, documents, and other electronic content from a computing device to an online storage account. These items can later be accessed from different computing devices. In some cases, such as Microsoft's OneDrive®, the service offers a means of storing, syncing, and sharing a wide variety of file types with other people and across multiple computing devices, as well as the possibility of synchronizing system settings, visual customizations, themes, app settings and browser tabs, history and saved passwords for different devices.

Once content has been stored in the online storage account, users are able to access their content items. However, synchronizing the content items themselves can be time consuming. As one example, a user can have numerous content items stored on or added to a client device, which can require additional time to synchronize. Traditional content item synchronization methods are designed to queue content items and then synchronize them one at a time. Typically, the queue is formed based on a simple directory search to identify the unsynchronized content items. Unfortunately, in many cases, a user may not be aware of the synchronization status of their content items, and mistakenly assume items still in the queue have been uploaded and are secured online. Thus, there remain significant areas for new and improved ideas for reducing data loss and providing users with tools for the improved management of such uploads.

SUMMARY

A content management system, in accord with a first aspect of this disclosure, includes one or more processors and one or more computer readable media including instructions which, when executed by the one or more processors, cause the one or more processors to receive, from a client device over a communication network, at least a first synchronization content message that may be configured to convey progress of a synchronization of a first synchronization content set that includes at least a first electronic content item. The first synchronization content message includes information about an amount of data remaining to be synchronized. The instructions also cause the one or more processors to determine that a synchronization of the first synchronization content set has a likelihood of being prolonged, the determination based at least in part on detection of an atypical synchronization condition being associated with the information of the first synchronization content message. In addition, the instructions cause the one or more processors to transmit a first message over a communication network to the client device indicating that the synchronization of the first synchronization content set has a likelihood of being prolonged.

A content management system, in accord with a second aspect of this disclosure, includes a synchronization content set tracking module configured to receive, from a client device over a communication network, at least a first synchronization content message that may be configured to convey progress of a synchronization of a first synchronization content set that includes at least one electronic content item, where the first synchronization content message includes information about an amount of data remaining to be synchronized. The system also includes a synchronization condition manager configured to determine that a synchronization of the first synchronization content set has a likelihood of being prolonged, the determination based at least in part on detection of an atypical synchronization condition being associated with the information of the first synchronization content message, as well as transmit a synchronization condition message over a communication network to the client device indicating that the synchronization of the first synchronization content set has a likelihood of being prolonged.

A method, in accord with a third aspect of this disclosure, includes receiving over a communication network from a client device, at least a first synchronization content message that may be configured to convey progress of a synchronization of a first synchronization content set that includes at least a first electronic content item. The first synchronization content message includes information about an amount of data remaining to be synchronized. In addition, the method includes determining that a synchronization of the first synchronization content set has a likelihood of being prolonged, this determination based at least in part on detection of an atypical synchronization condition being associated with the information of the first synchronization content message. Furthermore, the method includes transmitting a first message to the client device over a communication network indicating that the synchronization of the first synchronization content set has a likelihood of being prolonged.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 9A and 9B are a sequence depicting an example of a response to the detection of an atypical synchronization condition;

DETAILED DESCRIPTION

Figure 1A:
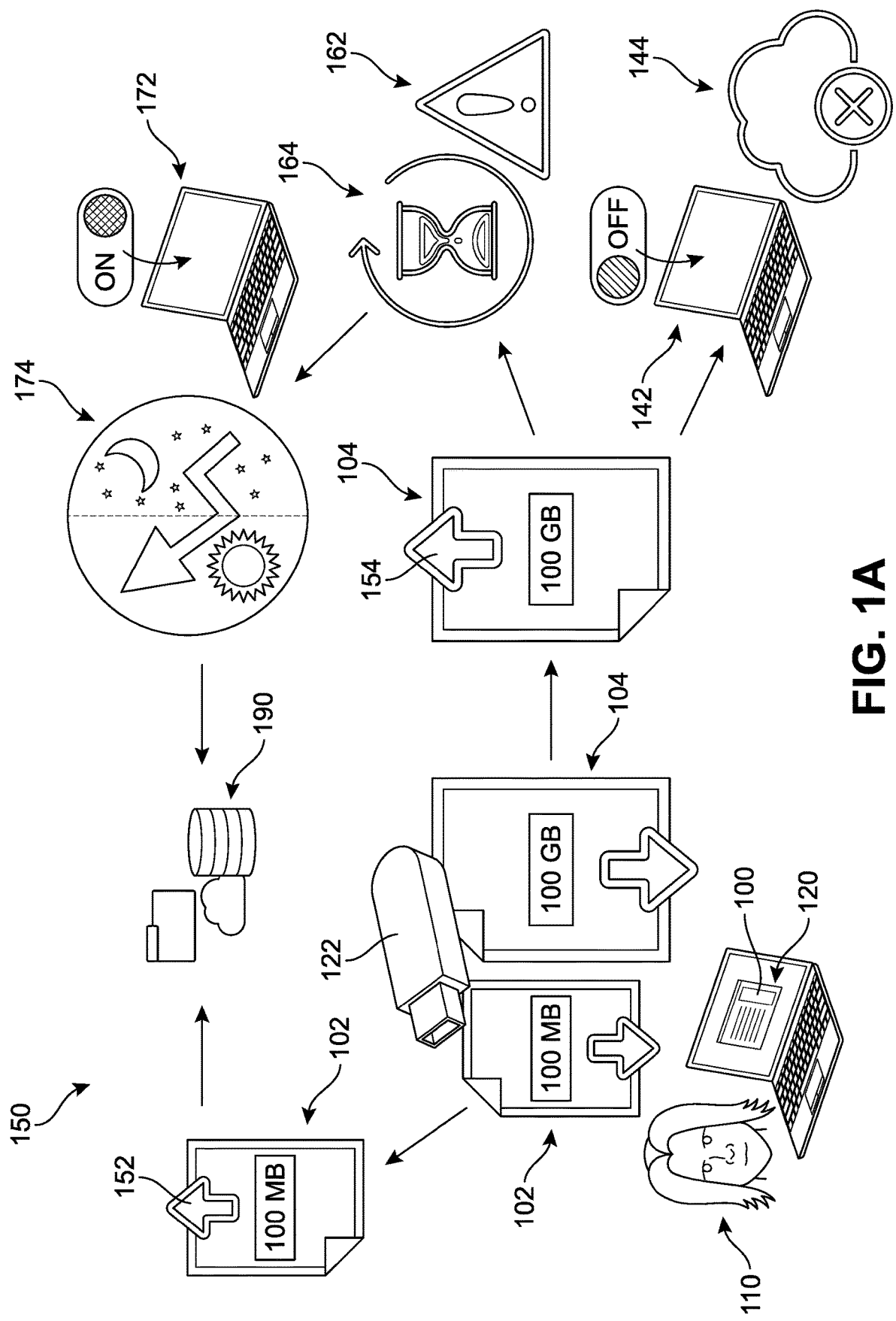
FIG. 1A is a conceptual illustration of an implementation of a content synchronization environment and FIG. 1B is a conceptual diagram depicting an example of a content management system architecture.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following description discloses systems and methods for management of electronic content items that are queued for synchronization between a content management system and a client device and may be associated with a delayed, prolonged, or otherwise longer-than-normal upload or download process. The system is configured to receive information about the electronic content items and determine if the synchronization will require a longer-than-normal synchronization session. Following such a determination, a notification can be sent to the client device to alert the user to the prolonged upload or download time that is likely to be needed to complete the synchronization of the electronic content items with the cloud server. Such proactive notifications by a content management system can warn users of potential data loss conditions and help minimize the possibility incomplete synchronization sessions.

For purposes of this description, a content management system (CMS) refers to a system by which a user can store content items, as well as perform a variety of content management tasks, such as retrieve, modify, browse, and/or share the content items, and enable a user to access the content from multiple client devices. Generally, a user can interact with a CMS through one or more client devices that are connected to a network. A CMS can support connections from a variety of different client devices, such as desktop computers, mobile computers, mobile communications devices (such as mobile phones, smart phones, tablets, etc.), smart televisions, gaming devices, set-top boxes, and/or any other network enabled computing devices. A CMS can be configured to accept connections from and interact with multiple client devices concurrently. Typically, a user engages with a CMS through interaction with a client-side application that is installed on the client's device, or via a third-party application, such as a web-browser application, and is configured to communicate with the CMS.

For purposes of this application, the terms "electronic content item" or "content item" include any digital data that may be presented (e.g., visually or audibly presented), including but not limited to an electronic document, a media stream, a web page, a hypertext document, an image, digital video or a video recording, digital audio or an audio recording, animation, a digital message, a markup language document, such as a HyperText Markup Language (HTML) or eXtensible Markup Language (XML) document, a form having blank components to accept entered data, or data describing the application of a GUI, and other digital data. In addition, "items" as used herein can include any folder, file, directory, or data object on an electronic device. As one example, items can refer to directory "folders" that can include documents, photos, music files, and video files.

Furthermore, the term "software application", "software", or "application" refers to a computer program that performs useful work, generally unrelated to the computer itself. Some non-limiting examples of software applications include word processors, spreadsheets, accounting systems, and telecommunication programs, as well as gaming software, utility and productivity tools, mobile applications, presentation graphics, and other productivity software. These are non-limiting examples, and any other electronic content editing or collaboration application may benefit from the disclosed implementations. Specific references to a software application by name throughout this description should not therefore be understood to limit the use of the proposed systems and methods.

In addition, synchronization refers to the uploading of content items from a client device over a communication network to a CMS or, alternatively, downloading of content items from the content management system to the client device over a communication network, to result in synchronized content libraries on both the client device and the content management system. It should be understood that for purposes of simplicity, the examples described herein will present situations in which an upload is occurring. However, all references to "upload" and examples of upload-based synchronizations presented in the following description should be understood to also encompass situations in which the synchronization event involves a download of electronic content. For example, the client device can be configured to synchronize content items stored on the client device with an associated account on the CMS by uploading the content items stored on the client device to a linked content management system. The client device can also be configured to synchronize content items by downloading of the content items stored on a linked content management system to the client device.

In some cases, an upload (or download) may take longer than expected. This can occur for a variety of reasons, such as slow network or processor speeds, inordinately large or "bulky" content item sizes, interruptions during upload, network connectivity issues, software incompatibilities, authorization or authentication issues, and other such impediments. Current service providers do not offer a means to determine if specific segments or items in a client upload session are taking longer than would be normally expected. Rather, the services typically attend to uploads as individual transactions, without the broader context of the size of each or all of the files to be synchronized in the pending session.

An end-user may not be aware of these potential complications, and subsequently pursue a course of action that leaves the user's content items vulnerable. While the user mistakenly believes their content items are safely backed up, they may engage in behavior that can potentially lead to data loss. As a result, the user of the electronic device may experience reduced functionality and/or problems with synchronizing to the latest and/or correct versions of data from the online storage system. As will be discussed below, it is therefore of great importance to provide users with a mechanism for preventing such data loss as well as access to information that allows the user to remain cognizant of synchronization status in real-time.

Figure 1B:
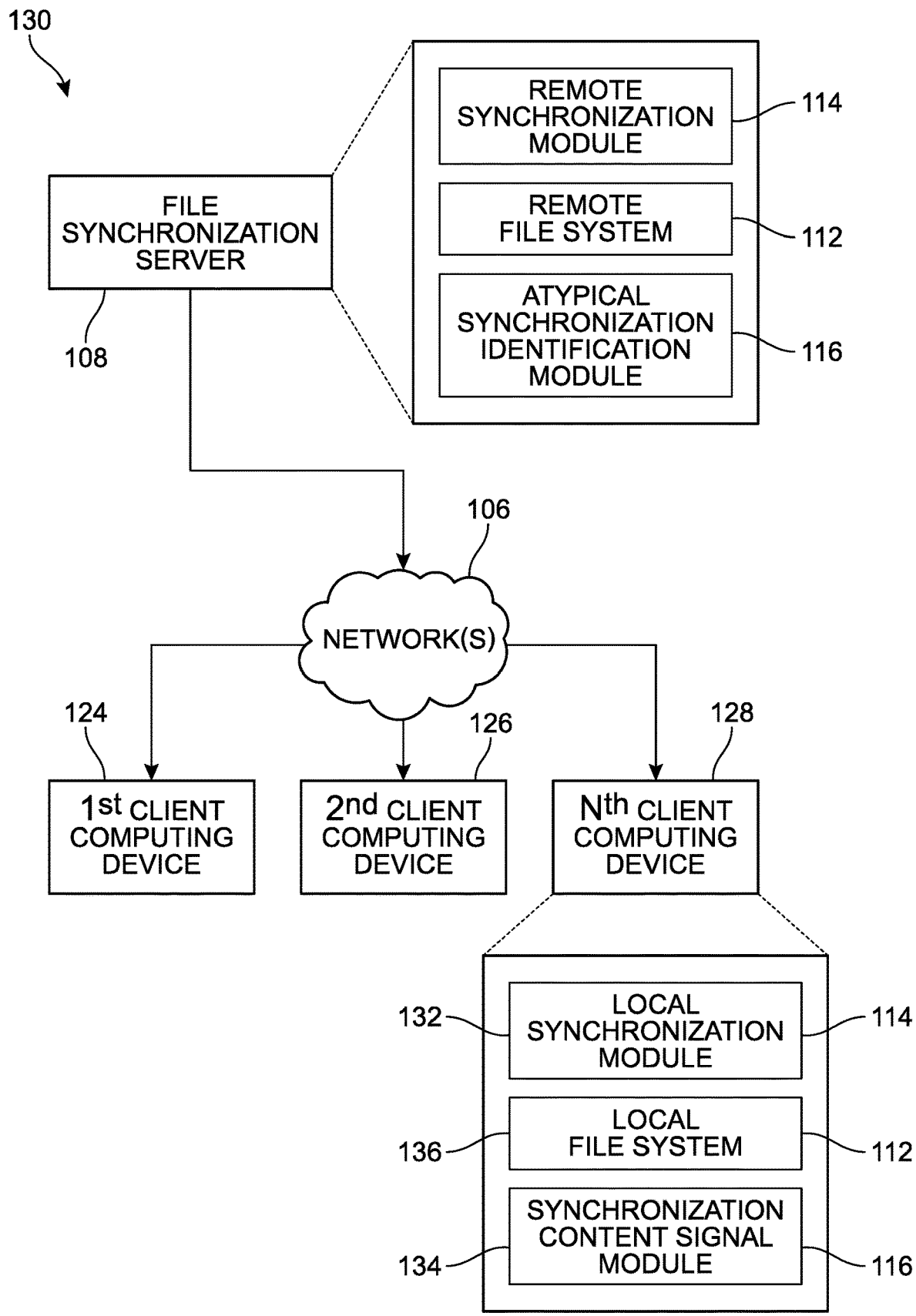
Figure 4A:
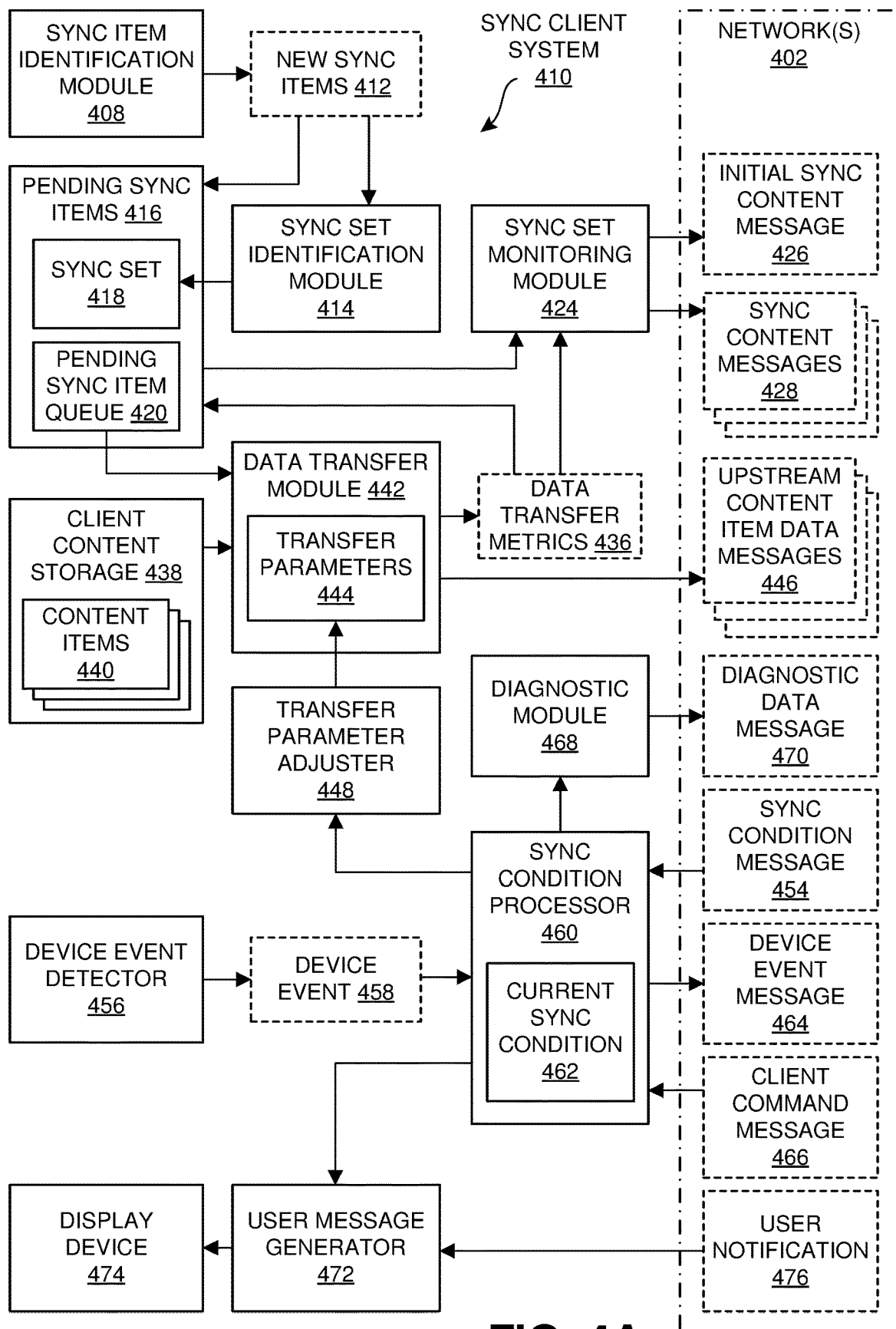
FIGS. 4A and 4B are conceptual diagrams illustrating an implementation of a distributed computing environment for managing content synchronization.
Figure 4B:
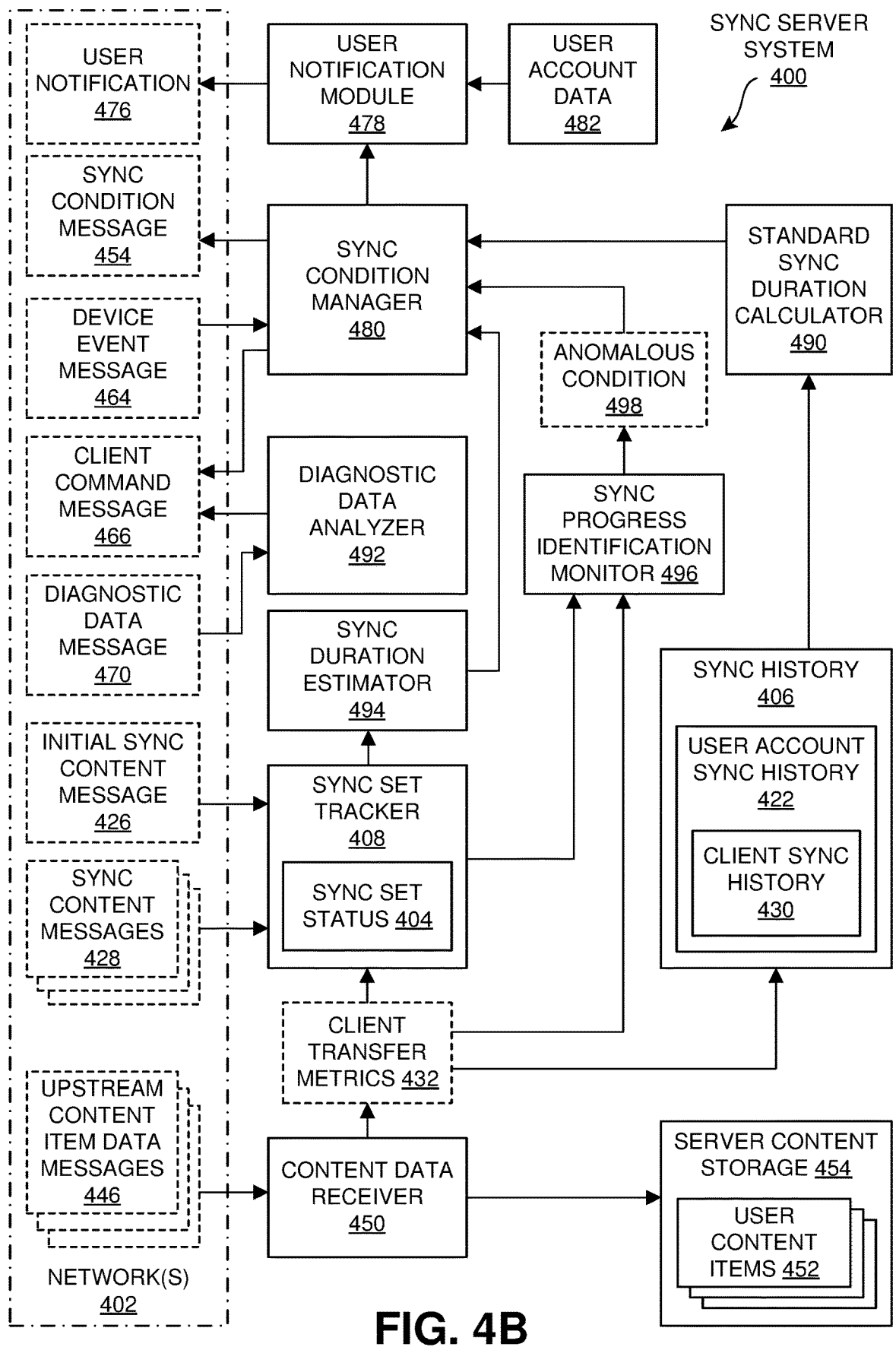

In order to better introduce the systems and methods to the reader, FIG. 1A presents a high-level example of a representative computing environment ("environment") 150 for implementing an electronic content synchronization management system (illustrated schematically in FIGS. 4A and 4B). In different implementations, the environment 150 can include one or more computing device end-users, or simply "users". One or more users can interact with or manipulate data presented via a user device. The various features and activities illustrated in FIGS. 1A and 1B are described generally, with further details and examples presented in connection with later figures.

As an example, a first user 110 is shown in FIG. 1. In this case, the first user 110 is accessing a synchronization client application ("synchronization client") 100 on a first device 120. The first device 120 may be a personal computer such as a desktop or laptop computer, a mobile device, or any other computer system having a file system. The first device 120 executes an operating system such as Microsoft Windows®, Mac OS®, Unix®, or other operating system, and includes memory, storage, a network interface, and other computer hardware not illustrated in FIG. 1A for clarity. The first device 120 creates, modifies, and/or deletes files on its storage system via its operating system, with the modifications that will be described herein. In addition, and as described further below, the first device 120 includes one or more synchronized folders. In FIG. 1A, only one device is shown, but any number of devices may be sharing synchronized folders via the synchronization service. For example, the first device 120 can be connected to a server, or an online or cloud-based computing storage service ("cloud storage service") 190. As first user 110 adds or modifies electronic content via first device 120, various content or files may be updated or saved in the cloud storage through a network connection.

Thus, in this example, the first device 120 allows the first user 110 to create, modify, and delete files on the client's local file system, and for those actions to be synchronized with versions of the same files on a host system and/or on one or more other client computers. In some implementations, the user may create a folder and designate it for synchronization. The file's contents are managed in part by synchronization client 100 to maintain the desired frequency or level of synchronization. Generally, users can create a shared synchronized folder either through a native control for synchronization client 100, or via a web server.

For purposes of this description, a "native control" refers to a mechanism for communicating content through a client application to an application user. For example, native controls may include pop-up windows that may be presented to a user via native application user interfaces (UIs), interactive buttons or other objects that may be shown to a user through native application UIs, as well as mechanisms that are native to a particular application for presenting associated content with those native controls.

In FIG. 1A, the synchronization client 100 can be understood to provide a UI that is configured to permit the first user 110 to select a folder or content to be shared. Thus, the first user 110 is using first device 120 to upload or synchronize one or more electronic content available in memory components associated with the first device 120, here illustrated by a memory stick 122. For purposes of this specific example, the electronic content set includes a first electronic content item ("first item") 102 and a second electronic content item ("second item") 104. The first item 102 is of a size that is significantly smaller than the size of second item 104. This is represented by the values shown on each content item icon, where first item 102 is 100 megabytes (MB), and second item is 100 gigabytes (GB), such that the second item 104 is 1000 times larger than first item 102. It should be understood that these values are for purposes of example only, and the electronic content being synchronized can vary in size and type.

Thus, in this example, the first user 110 is adding two new files from the memory stick 122 to a synchronized folder via the synchronization client 100 on first device 120. The operating system can send a message to indicate a change has occurred to the synchronized folder, as well as the location (path) of the folder or file within the folder where the change has occurred. As the folder is synchronized, data associated with each item is transmitted to the cloud storage service 190. Because each item includes different amounts of data, the time needed to upload or otherwise update each item can also vary greatly.

In many cases, the average user is unaware of issues that would cause the synchronization to be prolonged or be otherwise associated with a delayed time differential. As a result, the user may engage in behavior that prevents the completion of the upload(s), or may fail to perform some action that is necessary for the completion of the upload(s). For purposes of this application, an atypical synchronization condition or atypical upload and atypical download, refer to the detection or presence of a condition that may trigger a determination or prediction that a syncing of electronic content between a cloud storage and a client device will experience a delay (for example, as a result of a slow network connection or a substantially large file sync) or be otherwise identified as prolonged. In other words, identification of an atypical synchronization condition refers to cases in which the system may project the upload or download will require time beyond what would be normally expected with respect to an average or standard synchronization session.

In some implementations, 'excess' time can be in part estimated by reference to an average of previous syncing durations for the current user or client device, as well as the expected network speed for the current client device based on previous syncing events. This information can also be collected for other users and devices such that the standard duration for synchronization is determined by reference to individual-level and community-level synchronization data. Thus, an expected or standard duration of a synchronization session can be determined with reference to a wide variety of factors, as will be described below. Furthermore, in some implementations, parameters triggering a sync delay can be selected by a user, and/or can be based on default values provided or generated by the CMS.

In FIG. 1A, the first item 102 is illustrated as being uploaded (see a first symbol 152) with the upload completing successfully as shown by the path to cloud storage service 190. With respect to the second item 104 however, the upload status can differ. As the second item 104 is being uploaded (see a second symbol 154), if the first user 110 remains unaware of the fact that the second item 104 has not yet fully synchronized and does not provide the connection time needed for the completion of the upload—for example, by shutting or powering down the first device 120 (see a third symbol 142)—the upload may be interrupted or otherwise fail (see a fourth symbol 144). As another example, a user may manually close the local provider software associated with the first device 120, or the software may terminate unexpectedly (e.g., 'crashes') prior to the completion of the synchronization process. In such cases, the system will be unable to complete the sync operation. Furthermore, the software—being closed or terminated—may be unable to warn or notify the user of the first device 120 that the sync session has prematurely ended.

If, however, the first user 110 is preemptively alerted or notified (see a fifth symbol 164) to the prolonged or otherwise unusual amount of time required for this particular file upload (see a sixth symbol 164), he or she may opt to leave the device powered on (see a seventh symbol 172). The device may then continue to transfer the data over an extended period of time (for example, overnight, as represented by an eighth symbol 174). With this additional time, the second item 104 can be successfully synchronized, as shown by the path to cloud storage service 190. Thus, by detecting content items that may be associated with upload speed impediments or otherwise may be associated with delays, and providing the user with information regarding key file characteristics and/or upload status, the user can more thoughtfully attend to their electronic content storage, as well as maintain a more accurate, up-to-date knowledge of their uploaded content. Additional details regarding the components of the system will be presented with reference to FIGS. 4A and 4B.

Referring next to FIG. 1B, an example of a shared folder and file synchronization architecture is illustrated, herein referred to as a content management architecture ("architecture") 130. In different implementations, the architecture 130 can include at least one network 106, including but not limited to public networks such as the Internet, private networks such as an institutional and/or personal intranet, and/or some combination of private and public networks.

The environment includes a file synchronization server 108, which will be discussed in greater detail with respect to FIG. 4B. The file synchronization server 108 may include or have access to a remote file system 112, in which a plurality of folders, sub-folders, files, or a combination thereof may be stored. The plurality of folders, sub-folders, and files can include a plurality of shared or synchronized folders, shared sub-folders, shared files, shared sub-level files, and shared shortcuts. More particularly, the plurality of shared folders, shared sub-folders, shared files, shared sub-level files, and shared shortcuts can include a plurality of remote instances of synchronized folders, a plurality of remote instances of synchronized sub-folders, and a plurality of remote instances of synchronized files. As will be discussed in greater detail with reference to FIG. 4B, the server may also include modules configured to implement the various functions and features related to synchronizing shared folders and files, such as a remote synchronization module 114 and an atypical synchronization identification module 116.

Furthermore, in different implementations, the architecture 130 can include a first client computing device 124, a second client computing device 126, and an Nth client computing device 128. The client computing devices may include traditional client-type devices, as well as desktop computer-type devices, mobile-type devices, special purpose-type devices, embedded-type devices, and/or wearable-type devices. As an example, the client computing devices can include computer navigation type client computing devices such as satellite-based navigation systems including global positioning system (GPS) devices and other satellite-based navigation system devices, telecommunication devices such as mobile phones, tablet computers, mobile phone tablet hybrid, personal data assistants (PDAs), laptop computers, other mobile computers, wearable computers, implanted computing devices, desktop computers, personal computers, automotive computers, network-enabled televisions, thin clients, terminals, game consoles, gaming devices, work stations, media players, personal video recorders (PVRs), television set-top boxes, digital video recorders (DVRs), cameras, integrated components for inclusion in a computing device, appliances, or any other sort of computing device configured to receive user input.

Moreover, an entity, such as a user, may be associated with each, or any, of the client computing devices. FIG. 1B further illustrates the details regarding the Nth client computing device 128. It can be appreciated that the first client computing device 124 and the second client computing device 126 may be configured in the same manner as the Nth client computing device 128 and may include all or a combination of any of the components described herein in conjunction with the Nth client computing device 128.

In different implementations, the Nth client computing device 128 may include, for example, a local shared folder and file synchronization module 132, and a synchronization content message module 134, which will be discussed with respect to FIGS. 4A and 4B. The client computing device may include other modules, programs, or applications that are loadable and executable by the device processing units. The client computing device can also include a local file system 136 in which a plurality of folders, sub-folders, files, or a combination thereof may be stored. The plurality of folders, sub-folders, and files can include a plurality of locally synchronized folders, locally synchronized sub-folders, locally synchronized files, locally synchronized sub-level files, and locally synchronized shortcuts. More particularly, the plurality of locally synchronized folders, sub-folders, files, sub-level files, and shortcuts can include a plurality of local instances of shared synchronized folders, a plurality of local instances of shared synchronized sub-folders, and a plurality of local instances of shared synchronized files.

Figure 2:
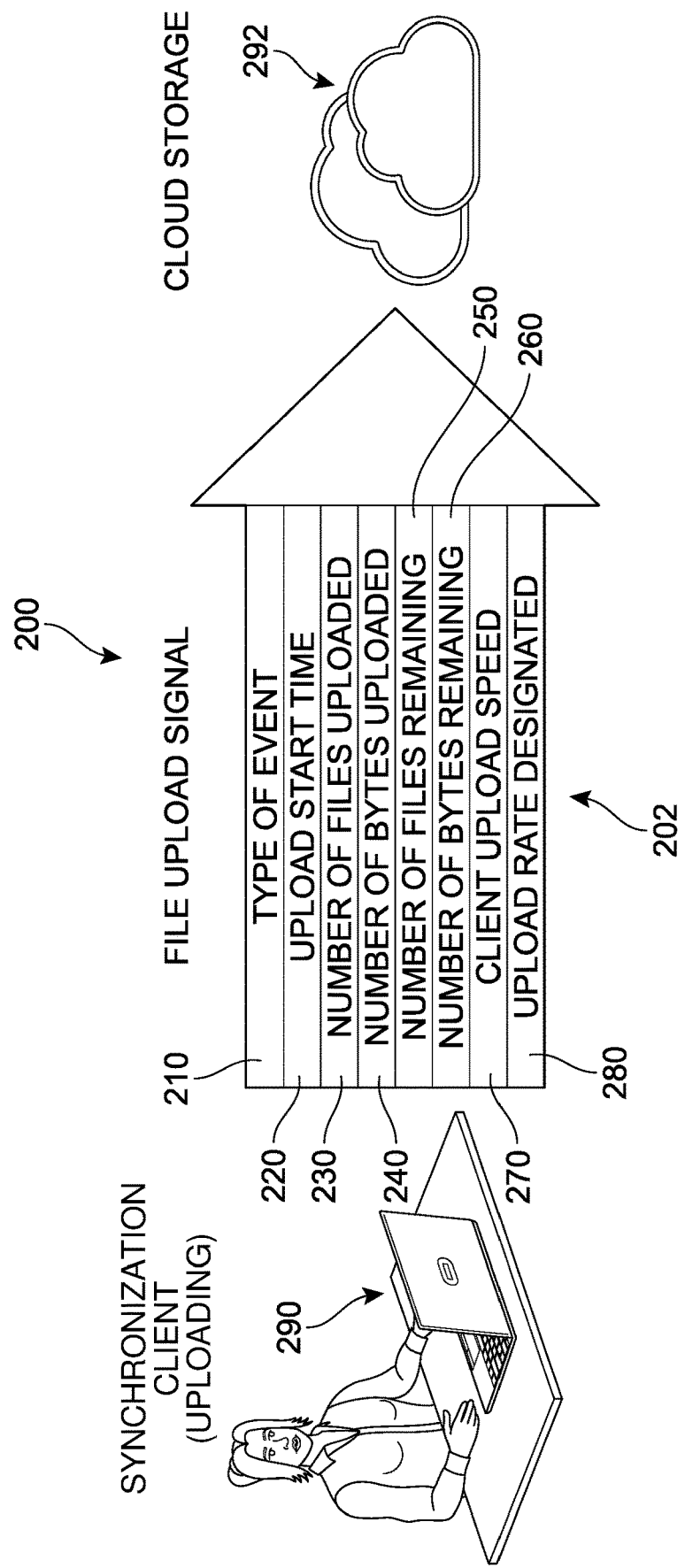
FIG. 2 is a schematic illustration of an implementation of a message conveying synchronization content set characteristics.

In order to provide further context for the uses and applications of the systems described herein, FIG. 2 presents a non-limiting example of characteristics or facets of a synchronization characterization message ("message") 200 that may be incorporated, added, or otherwise included before, during, and/or after a transfer of data from a synchronization client 290 to a cloud storage service 292. In different implementations, one or more of these or other upload set (or download set) characteristics, attributes, or parameters can be used by the system to determine whether the upload should be designated as likely to be prolonged. For purposes of this application, "synchronization content set" will be used to refer to content items that are queued for synchronization in a pending synchronization session. The session can be initiated automatically at predetermined intervals or following particular triggering events or can be manually initiated by a user (see FIGS. 5-8), and can encompass one file, one folder, or a plurality of folders or directories. A queue refers to the sequence of upload or download (e.g., which item is synced first, which item is synced after). While there are occasions where two or more items are being synced at the same time, it can be understood that generally the items will be uploaded or downloaded following a sequence or succession associated with the order of the sync queue.

While numerous synchronization content set characteristics are identified below, it should be understood that in different implementations, a message can include only one, some, or none of the following information. In the example of FIG. 2, the message 200 carries a plurality of signals or submessages ("submessages") 202 that can provide an indication of how large the scheduled or current synchronization content set size is. In some implementations, the submessages 202 can include a first message characteristic 210 that indicates the details for the upload event, including but not limited to (a) whether a synchronization content set has started to transfer data for the content items; (b) whether a synchronization content set has completed its transfer of data for the content items; (c) synchronization content set transfer progress; and/or (d) information regarding client device or application shutdown or power state, pause, or disconnect, as well as resumption of an upload/download, and other upload/download event details.

In different implementations, the message 200 can also be configured to provide additional information. For example, a second message characteristic 220 can convey the time that the upload was begun. A third message characteristic 230 can convey the number of files already uploaded in the current synchronization content set. Similarly, a fourth message characteristic 240 can convey the number of bytes already uploaded in this set. It can be understood that the value of both the third message characteristic 230 and fourth message characteristic 240 would be zero during the first message transmission in most cases. However, in some implementations, if an upload or synchronization session is being 'restarted' or reestablished after being prematurely terminated or suspended, the first message transmission values for the third message characteristic 230 and fourth message characteristic 240 may be non-zero.

In addition, a fifth message characteristic 250 can convey the number of files remaining or left to be uploaded in the current synchronization content set. A sixth message characteristic 260 can convey the number of bytes remaining or left to be uploaded in the current synchronization content set. It can be understood that the value of both the fifth message characteristic 250 and sixth message characteristic 260 would be zero during the final message transmission.

Other relevant upload message characteristics may include a seventh message characteristic 270 indicating the upload speed that is perceived by the client for the current synchronization content set (which would have a value of zero during the first message transmission), and an eighth message characteristic 280 indicating the upload rate configured in the client device for the current synchronization content set. As an example, the rate can be a default value, can be designated to automatically increase or decrease as governed by the processor speed, network connection, file size(s), and other factors, can be limited or unlimited, or can be otherwise configured or adjusted. In other implementations, information regarding the type of connection or device, the size or speed of other network traffic, the time of day, the location of the device, and other such factors may also be transmitted by message 200. In other implementations, the information can be in the form of states or stages assigned to the data synchronization status, such as a download status, an upload status, an idle status, a transfer progress status, a cached status, and/or an error status, for example for each content item and/or other unit of data.

The server can also be configured to receive other types of information from the client device in some implementations. For example, various heuristics or criteria may be included in the message and evaluated by the service to help determine the likelihood of a prolonged synchronization, including but not limited to (a) whether one or more content items in the upload set are taking longer than expected to synchronize; (b) whether there are unexpected gaps or intervals between save points; (c) whether the estimated time for synchronization exceeds a predefined threshold value; (d) the type of computing device being used for the client upload; (e) the detection of a large number of file deletions in the user's storage account, and other such information.

In some implementations, the system can include provisions for maintaining or updating the information being provided to the cloud storage service. For example, in order for the information carried by the message 200 to continue to be updated, a first message can be followed by a plurality of additional messages carrying updated information that can be transmitted at regular or, in some cases, irregular intervals.

Figure 3:
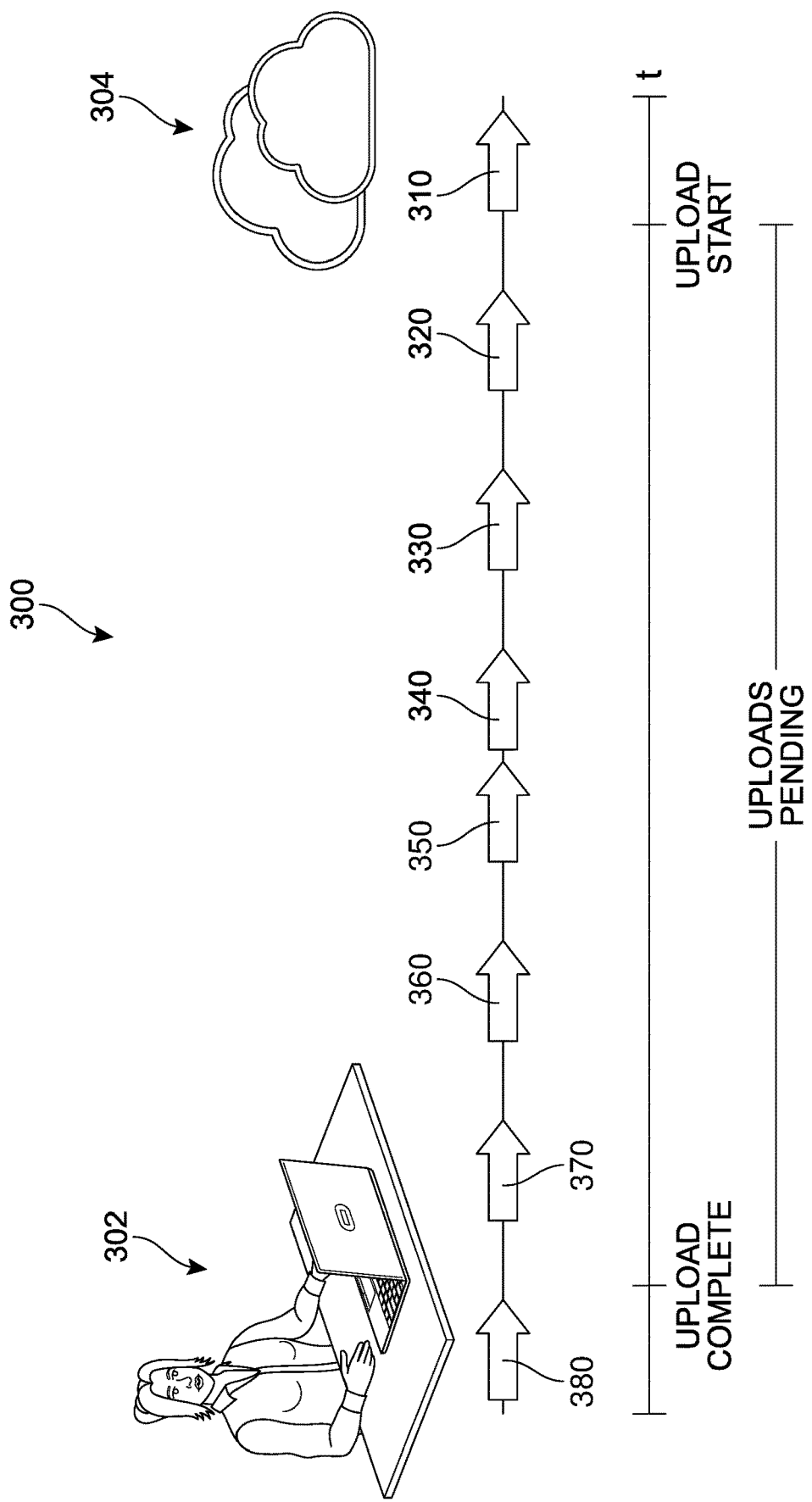
FIG. 3 is a schematic illustration of an implementation of messages being transmitted from a client device to a cloud storage service.

In FIG. 3, a set of messages 300 is illustrated schematically by a series of arrows that are being transmitted between a client device 302 and a cloud storage service 304. In this example, an initial or first message 310 has been sent up by the client immediately prior to the start of the synchronization of a synchronization content set. In addition, a final message 380 is sent immediately following the conclusion or completion of the synchronization.

Between these two messages, a number of additional messages can be transmitted; in this example, a second message 320, a third message 330, a fourth message 340, a fifth message 350, a sixth message 360, and a seventh message 370 are shown being transmitted during the synchronization of the synchronization content set. In some implementations, the system can be configured to generate or transmit such intervening messages at substantially regular intervals. For example, a message can be sent every 10 minutes, half hour, two hours, six hours, or any other interval, while there are uploads pending in the synchronization content set. This is represented by the approximately equal spacing between the first message 310 and the second message 320, the second message 320 and third message 330, the third message and the fourth message 340, the fifth message 350 and sixth message 360, the sixth message 360 and seventh message 370, and the seventh message 370 and the final message 380.

However, it should be understood that in some implementations, additional messages may sent at other times or at differing intervals (i.e., irregular intervals). This is represented by the relatively smaller spacing depicted between the fourth message 340 and the fifth message 350. Such irregular transmissions can occur, for example, in cases where the client application is stopped or interrupted before the upload is completed, when the client application is paused and/or resumes, when the connection speed changes, when a value for an upload message characteristic undergoes a significant change, and/or any other action is taken by a user that affects the upload.

In order to provide greater clarity with respect to the disclosed implementations, an example of a content management system ("system"), comprising a synchronization client system 410 and a synchronization server system 400, is presented with reference to the sequence of FIGS. 4A and 4B. It is noted that although the descriptions of FIGS. 4A and 4B discusses examples of upstream synchronization of content items from the synchronization client system 410 to the synchronization server system 400, the described features and features may be applied to similar effect for downstream synchronization of content items to ensure content items are fully and efficiently received at the synchronization client system 410. Furthermore, all features and functions described elsewhere in this description may be implemented by the system described in FIGS. 4A and 4B.

In FIG. 4A, one implementation of a synchronization client system 410 for monitoring synchronization progress and transmitting synchronization content messages to the synchronization server system 400 is depicted. The synchronization client system 410 may include any of the features described for the synchronization client application 100, client computing device 128, synchronization client 290, and synchronization client 302. The synchronization client system 410 includes a synchronization item identification module 408, which is configured to, among other things, identify one or more new sync items 412 each identifying a content item 440 included in a client content storage 438, or a portion of a content item 440, to be synchronized from the synchronization client system 410 to the synchronization server system 400. For example, in response to a content item 440 being created or modified, a respective new sync item 412 is generated. The new sync items 412 are provided to a pending synchronization items module 416, which may be configured to add the new sync items 412 to a pending sync item queue 420. The pending sync item queue 420 is configured to determine an order for synchronizing pending sync items; for example, the pending sync item queue 420 may be configured to select a next sync item from the pending sync items.

The synchronization client system 410 includes a synchronization set identification module 414, which is configured to receive the new sync items 412 identified by the synchronization item identification module 408 and identify a synchronization set 418 for the new sync items 412. For example, in response to a determination that there is no active synchronization set 418 (the term "active" referring to a synchronization set 418 including one or more sync items that have not been fully synchronized) corresponding to one or more of the new sync items 412, an active synchronization set 418 is instantiated. Where there is an active synchronization set 418 corresponding to a new sync item 418, the new sync item 418 is added to the synchronization set 418. In some implementations, multiple synchronization sets 418 may be simultaneously active. For example, individual new sync items 412 may be selectively added to different active synchronization sets 418. In some implementations, each synchronization set 418 has a respective pending item queue 420. The synchronization client system 410 is configured to track the progress of sync items included in each synchronization set 418, such as, but not limited to, sync items that have been transferred, sync items currently being transferred, sync items that are awaiting to begin transfer, and related data sizes.

The synchronization client system 410 includes a data transfer module 442 configured to retrieve sync items from the pending item queue 420, obtain data from the client content storage 438 for corresponding portions of content items 440, and transfer the data in upstream content item data messages 446 to the synchronization server system 400 via network(s) 402. Use of the network(s) 402 by the data transfer module 442 is performed according to various transfer parameters 444. For example, the transfer parameters 444 may specify a maximum upstream (from synchronization client system 410 to the synchronization server system 400) transfer rate, a maximum downstream transfer rate, payload size for upstream content item data messages 446 (such as for a content item transferred via multiple content item data messages 446 for respective portions of the content item), number of parallel transfers, network connection parameters, and/or a network selection from multiple available networks. Although not illustrated in FIG. 4A, the data transfer module 442 may additionally be configured to receive downstream content item data messages for downstream synchronization.

The data transfer module 442 is further configured to provide data transfer metrics 436 regarding the transmission of content item data messages 446. For example, the data transfer metrics 436 may identify sync items for which synchronization has been completed, identify sync items that are not completed, indicate an amount of content item data that has been transferred for a period of time, indicate a current realized upload speed, and/or indicate an average realized upload speed for a period of time. In some implementations, the pending sync items module 416 is configured to obtain and process the data transfer metrics 436 to determine the status of related sync items.

The synchronization client system 410 includes a sync set monitoring module 424 that is configured to monitor the status of sync sets 418 and report the status of sync sets 418 to the synchronization server system 400. In some implementations, the sync set monitoring module 424 is configured to transmit an initial sync content message 426 in response to a determination that a new sync set 418 is active, much as described for the first message 310 in FIG. 3. In some implementations, the sync set identification module 414 is configured to transmit the initial sync content message 426 in response to activating a new sync set 418. The sync set monitoring module 424 is configured to obtain and process the data transfer metrics 436 to track the process of sync sets 418. The sync set monitoring module 424 is configured to, based on the data transfer metrics 436, periodically transmit sync content messages 428, as discussed for the message 200 in FIG. 2 and the second message 320, third message 330, fourth message 340, fifth message 350, sixth message 360, and seventh message 370 in FIG. 3. By use of the initial sync content message 426 and the sync content messages 428, the synchronization client system 410 informs the synchronization server system 400 of new sync sets 418 and their synchronization progress over time. It is noted that although synchronization set identification module 414, pending synchronization items module 416, and sync set monitoring module 424 are shown as separate modules in FIG. 4A, in some examples they may be combined into a single module.

With respect to messages received from the synchronization server system 400, in some implementations, a sync condition message 454 (indicating, for example, the detection of atypical conditions associated with a synchronization of a sync set 418) can be received from the synchronization server system 400 by a sync condition processor 460 included in the synchronization client system 410. In some implementations, a condition indicated by a sync condition message 454 may be stored as a current sync condition 462, and the sync condition processor 460 is configured to respond to device events 458 obtained from a device event detector 456. For example, in response to a device event 458 indicating an imminent change in power state, such as a shutdown or transition to a sleep state, and the current sync condition 462 indicating a long-running synchronization is ongoing, the sync condition processor 460 may interrupt the change in power state. In some implementations, the sync condition processor 460 is configured to, in response to a device event 458, transmit a corresponding device event message 464 to the synchronization server system 400.

The sync condition processor 460 is configured to, in response to sync condition messages 454 received from the synchronization server system 400, client command messages 466 received from the synchronization server system 400, and/or device events 458, perform various actions in the synchronization client system 410. In some examples, in response to a client command message 466 requesting a diagnostic procedure be performed, the sync condition processor 460 invokes a diagnostic module 468. Depending on the requested diagnostic procedure, the diagnostic module 468 may collect and analyze system performance information (such as, but not limited to, processor load and/or other running processes) and/or network performance information.

In some examples, the sync condition processor 460 is configured to invoke a transfer parameter adjuster 448, which is configured to adjust the transfer parameters 444. For example, in response to a sync condition message 454 or a client command message 466 requesting a change in transfer parameters 448, the sync condition processor 460 may change transfer parameters 444 relating to, for example, a maximum upstream transfer rate, maximum downstream transfer rate, and/or changing to a different network.

In some examples, the sync condition processor 460 is configured to invoke a user message generator 472, which is configured to present informational messages to a user of the synchronization client system 410 via a display device 474. Additionally, the user message generator 472 may be configured to, in response to a user notification 476 received from the synchronization server system 400, present a corresponding informational message to a user of the synchronization client system 410 via the display device 474.

Referring now to FIG. 4B, the synchronization server system 400 is in communication with synchronization client system 410 of FIG. 4A, and may be in communication with additional synchronization client systems. The synchronization server system 400 may include any of the features described for the file synchronization server 108, cloud storage service 190, cloud storage service 292, and cloud storage service 304. It can be understood that the device event message 464, diagnostic data 470, initial sync content message 426, sync content messages 428, and content item data messages 446 shown in FIG. 4B can be generated and supplied by the synchronization client system 410, as described in FIG. 4A.

The synchronization server system 400 includes a content data receiver 450, configured to receive the content item data messages 446 for sync items and create, modify, and/or delete respective user content items 452 maintained in a server content storage 454. The server content storage 454 may implement versioning to preserve previous versions of modified or deleted user content items. The content data receiver 450 is configured to, based on the content item data messages 446 received from the synchronization client system 410, generate client transfer metrics 432 regarding the receipt of content item data messages 446 from the synchronization client system 410. For example, the client transfer metrics 432 may identify sync items for which synchronization has been completed, identify new sync items, indicate an amount of content item data that has been transferred for a period of time, indicate a current realized upload speed, and/or indicate an average realized upload speed for a period of time.

The synchronization server system 400 is configured to, based on the client transfer metrics 432, maintain a sync history 406. The sync history 406 stores information regarding the synchronization activities for a plurality of users of the synchronization server system 400. The sync history 406 includes a user sync history 422 for synchronization activities for a user account associated with the synchronization client system 410. Similar user account sync histories may be stored in the sync history 406 for other user accounts associated with the synchronization client system 410. The user sync history 422 includes a client sync history 430 for synchronization activities for the synchronization client system 410. Similar client sync histories may be included in the user sync history 422 for other synchronization client systems associated with the user account for the user sync history 422. Information included in the client sync history 430 includes, for example, average upstream data transfer rates achieved by the synchronization client system 410 for previously completed sync sets.

The synchronization server system 400 includes a sync set tracker 408 configured to maintain a sync set status 404 for each sync set identified by the synchronization client system 410 in a respective initial sync content message 426. The sync set tracker 408 is configured to receive and process sync content messages 428 to update the sync set status 404. In some implementations, the sync set tracker 408 is configured to, based on the client transfer metrics 432, update the sync set status 404. For example, where only a first sync set has been identified by, and pending for, the synchronization client system 410, upstream content item data messages 446 received from the synchronization client system 410 may be assumed to be for the first sync set and used to determine numbers of content items received, amounts of upstream data received, and realized upstream data transfer rates for the sync set, and update the sync set status 404 accordingly. In some examples, the sync set status 404 may also maintain information from the transfer parameters 444, such as a maximum upstream data transfer rate.

The synchronization server system 400 includes a sync duration estimator 494 which is configured to, based on the sync set status 404 maintained by the sync set tracker 408, estimate a remaining amount of time for a pending sync set to complete its synchronization. The estimated remaining amount of time for a sync set may be calculated based on at least a remaining amount of data to be transferred for the sync set and a realized upstream data transfer rate for the sync set. The synchronization server system 400 also includes a standard sync duration calculator 490 configured to provide a standard synchronization duration for the synchronization client system 410 based on upstream data transfer characteristics indicated by the sync history 406. In some examples, the standard synchronization duration includes synchronization statistics, such as mean, median, variance, and/or standard deviation values for synchronization durations and/or data sizes for completed sync sets.

The synchronization server system 400 includes a sync condition manager 480 configured to, based on the estimated remaining amount of time provided by the sync duration estimator 494 and the standard synchronization duration provided by the standard sync duration calculator 490, determine if the pending sync set has a likelihood of being prolonged. In some examples, it is determined that the pending sync set has a likelihood of being prolonged when the estimated remaining amount of time exceeds the standard synchronization duration by a predetermined margin, such as 20 percent. In other implementations, the margin may be configurable. For example, the margin may be initially populated to a default value, but also be dynamically configured by or from the synchronization service. In response to a determination that the pending sync set has a likelihood of being prolonged, the sync condition manager 480 may transmit a sync condition message 454 to the synchronization client system 410. In some examples, the sync condition manager 480 may issue a client command message 466, such as in response to a device event message 464.

The synchronization server system 400 includes a sync progress identification monitor 496 configured to determine, based on the sync set status 404 and the client transfer metrics 432, when an anomalous condition 498 has occurred. An example of the sync progress identification monitor 496 is discussed in connection with FIG. 7. The synchronization server system 400 includes a diagnostic data analyzer 492 configured to, in response to a diagnostic data message 470, analyze the received diagnostic data and, in some circumstances, issue a client command message 466. For example, the diagnostic data analyzer 492 may issue a client command message 466 requesting a specified change in the transfer parameters 444.

The synchronization server system 400 may include a user notification module 478 configured to identify various user notification channels indicated by user account data 482 for the user account associated with the synchronization client system 410 and issue one or more corresponding user notifications 476. For example, as illustrated in FIG. 4A, a user notification 476 may be transmitted to the synchronization client system 410 and processed by the user message generator 472. In some examples, user notifications 476 may be sent to other devices associated with the user account, such as to other synchronization client systems. For example, the synchronization client system 410 may be implemented on a desktop computer system and another synchronization client system implemented on a mobile device such as a smartphone. Other examples of user notifications 476 include, but are not limited to, emails, direct messages via social media channels, instant messaging messages, and/or mobile device text messages. The sync condition manager 480 may be configured to use the user notification module 478 to issue user notifications 476.

Figure 5:
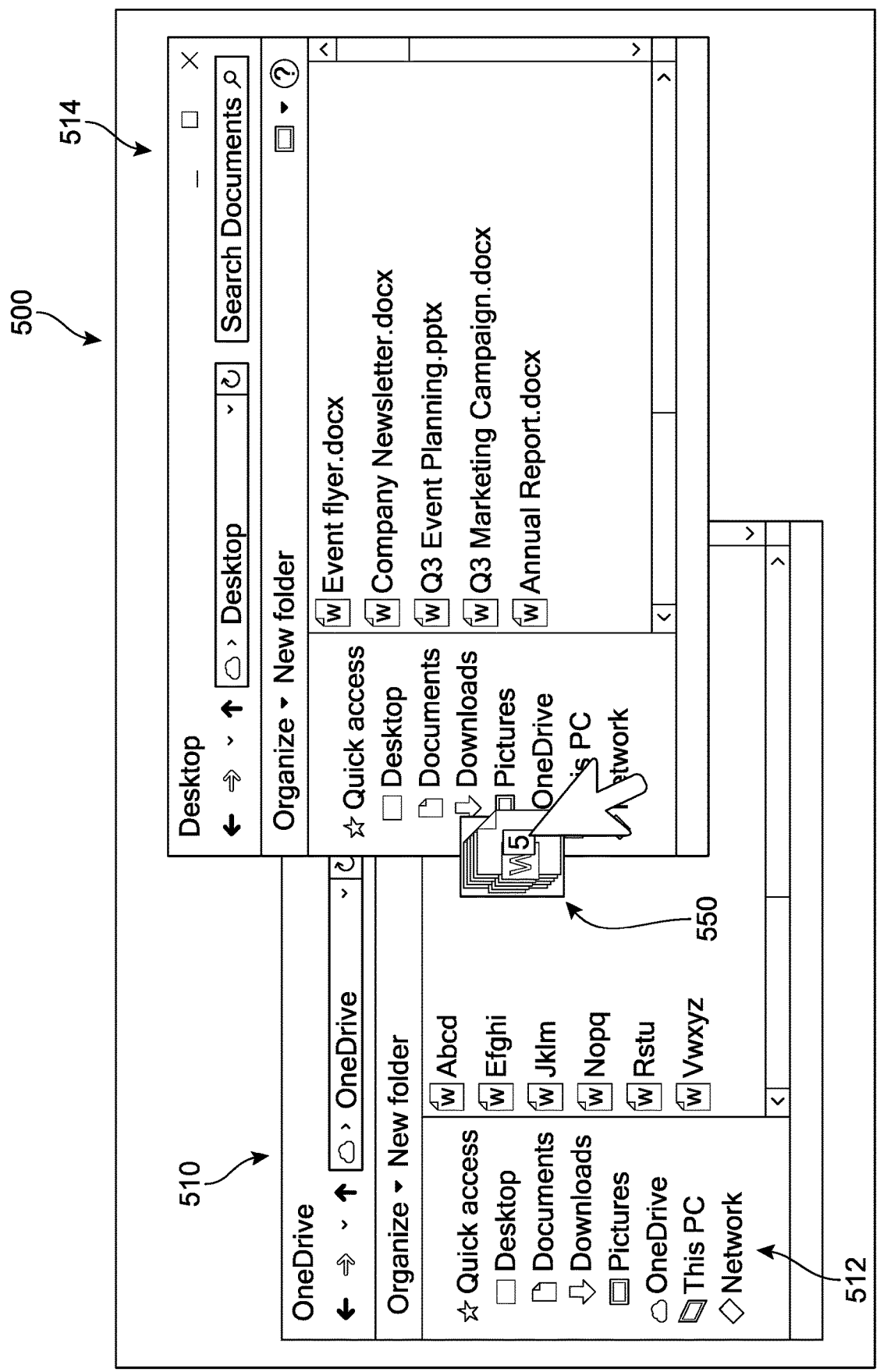
FIG. 5 is a representation of a device display with an implementation of a synchronization client application and client file directory.

Referring now to the sequence of FIGS. 5-8, one implementation of the proposed system is illustrated. In FIG. 5, a device display 500 presents an interface for a synchronization client application 510. For purposes of simplicity, the synchronization client application 510 in FIG. 5 includes a user interface shown here as a synchronization folder 512 (labeled 'OneDrive'), and a user has also concurrently opened or otherwise accessed an electronic content directory ("directory") 514 currently stored on the client device (labeled 'Desktop'). In other implementations, the synchronization client application 510 may include any other user interface configured to facilitate synchronization of electronic content.

In some cases, the synchronization client application 510 can be configured to synchronize any changes to content in its designated folder and its sub-folders, such as new, deleted, modified, copied, or moved files or folders. In different implementations, the synchronization client application 510 can be a separate software application, and/or can integrate with an existing content management application in the operating system. FIG. 5 presents one example of client software that is integrated with an existing content management application such that a user is able to manipulate content directly in a local folder (synchronization folder 512) while a background process monitors the local folder for changes and synchronizes those changes to the cloud storage. In other implementations, the background process can also identify content that has been updated and synchronize those changes to the local folder. The synchronization client application 510 can be configured to provide notifications of synchronization operations in some implementations.

In other implementations, a user may have content items stored on their client device in a location other than within the designated synchronization folder of the synchronization client application 510. For example, the user may access a content management application, such as a music or photo library, which stores the content items in a location other than the designated synchronization folder. The client device can be configured to identify the location of these content items by searching the memory of the client device for files associated with specified file extensions indicating that the file is a content item that is to be synchronized. In some other implementations, the client device can perform a complete or partial search of the client device's accessible storage, such as a local hard drive or memory stick, to identify the location of content items.

Upon identification of content items in memory, the client device can be configured to import the content items to the content management system. In some implementations, this can include creating a copy of the content items, which are then stored in a designated synchronization folder, resulting in the content items being synchronized with the content management system. In some other implementations, the content items can instead be uploaded to the content management system directly from the identified location, without copies of the content items being stored in the designated synchronization folder.

As illustrated in FIG. 5, during various user interactions with the synchronization client application 510, a user may opt to modify the contents in the synchronization folder 512. As one example, a user may select or otherwise designate one or more content items 550 to copy or move to the synchronization client application 510 from the directory 514. As the user makes changes to the folder and its contents on the client device, those changes can be propagated to the synchronized version on the host server. In this example, a user is adding new files to the synchronization folder 512. As new files are detected, the CMS selected by the user can initiate an upload.

Figure 6:
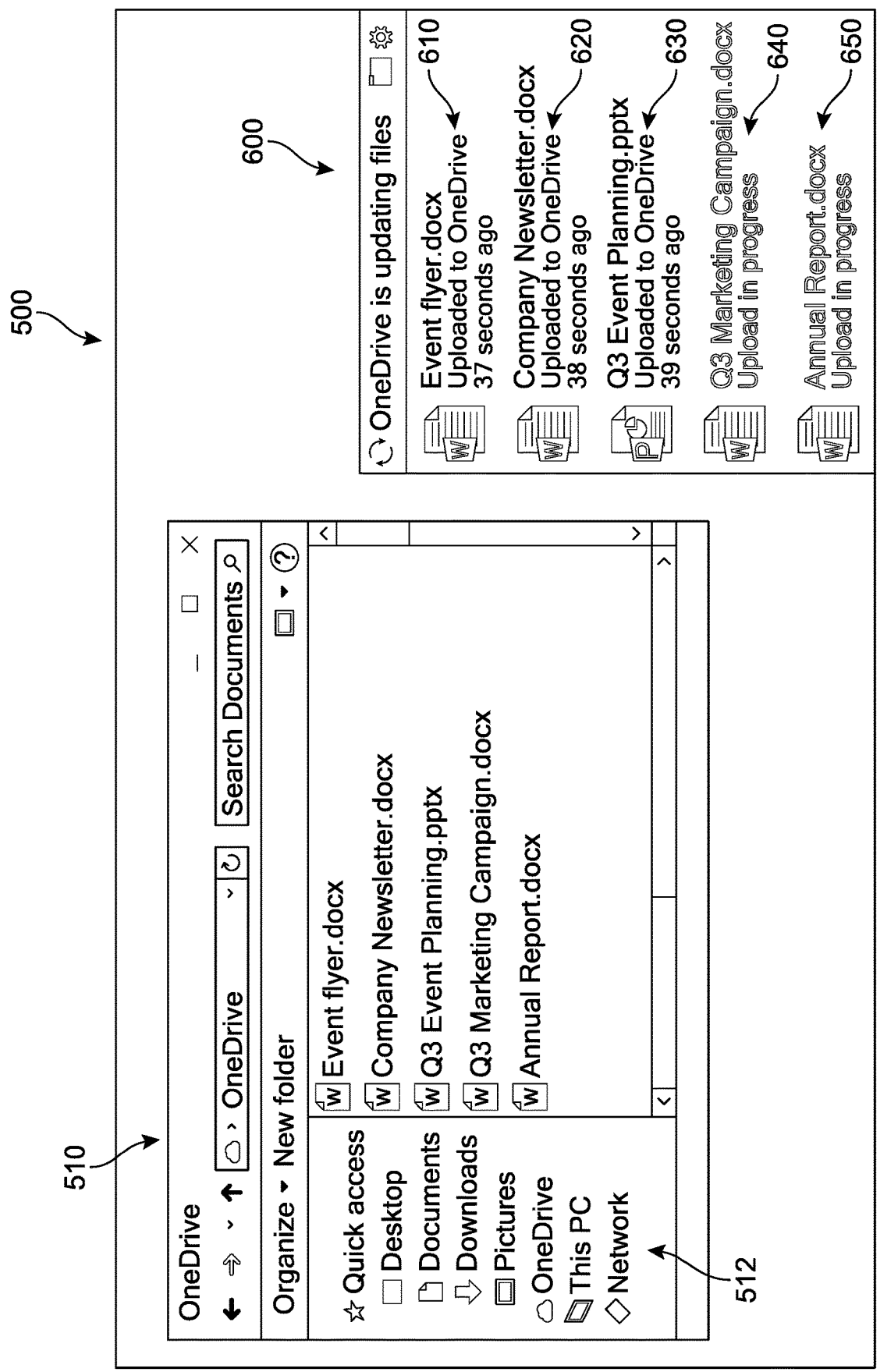
FIG. 6 is a representation of a device display with an implementation of a synchronization client application and a progress panel.

In FIG. 6, an example of the synchronization-in-progress is depicted. In some implementations, while the upload of the new files is occurring, the CMS can be configured to display or otherwise provide synchronization status information for each of the content items. One possible presentation of synchronization status information is shown in FIG. 6 as a progress panel 600, which can also serve as a type of user interface. The progress panel 600 can provide a summary of the status of the content items collectively and/or individually, and may provide an indication of the current save state of the documents (e.g., "uploaded"; "upload in progress"; "upload failed"; "upload paused"; "upload error"; "synchronization offline", and other status indicators). The indication or current state label for a content item may be displayed in a generally user-friendly listing in the progress panel 600 such that the user may readily identify each document's upload status. In some implementations, the upload status indicator may be interactive, such that when selected, the user may see additional synchronization status details and/or be offered the opportunity to make some modifications to the document metadata or path.

In one implementation, the indication of the current state can be substantially minimal such that the indication is not distracting to a user.

In FIG. 6, five content items are shown, as well as a corresponding synchronization status indicator for each item. This information can be refreshed periodically by the system, or by the user. In this case, a first content item 610, a second content item 620, and third content item 630 each include an indicator confirming their successful upload, as well as an indicator of how recently the synchronization for the content item occurred. An "uploaded" or "saved" synchronization state indicator informs a user that a content item is up to date at its endpoint cloud storage. In other words, the document is considered to be saved and backed up. It can be understood that the state indicator may be represented in a variety of formats which may include various icons, text, animations, symbols, graphics, etc. In addition, in one implementation, no visual representation of the synchronization state may be shown.

Two additional content items—a fourth content item 640 and a fifth content item 650—are also listed in the progress panel 600. The fourth content item 640 and fifth content item 650 include a status indicator indicating that the document has not yet been successfully uploaded (if the document is a new item). If the document is being updated (rather than being a new file) the status indicator can indicate that the content item includes changes that have not yet been synchronized with the version in cloud storage.

Figure 7:
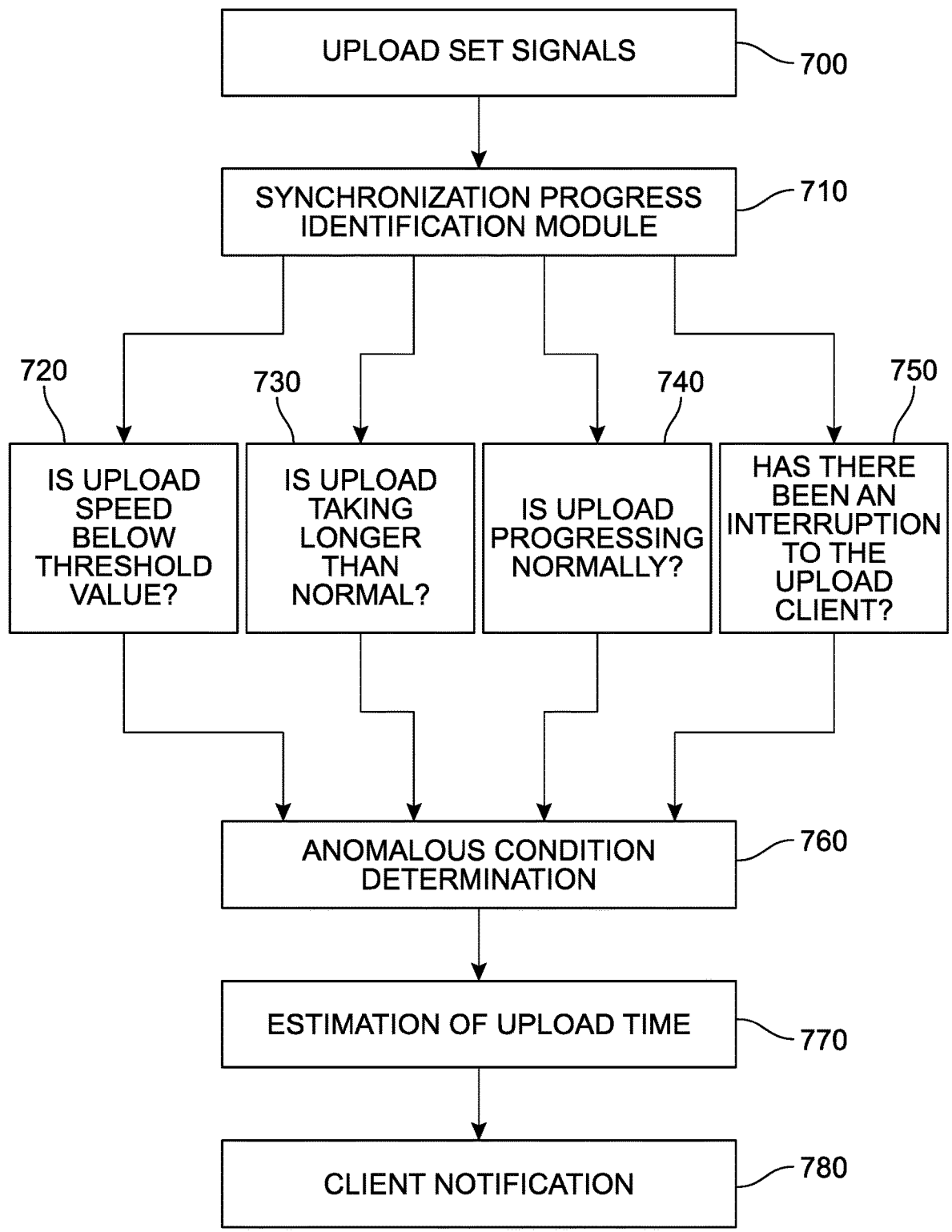
FIG. 7 is a flow diagram illustrating an implementation of a method of detecting an atypical synchronization event.

As discussed above with respect to FIGS. 3 and 4, in different implementations, various synchronization content set attributes or characteristics can be conveyed to the CMS service provider before the upload, as the upload occurs, and/or following the completion of the upload. As this type of information is made available to the CMS service provider, an intelligent assessment and prediction regarding the synchronization can be made (see for example, FIGS. 4A and 4B). Referring now to FIG. 7, one implementation of a decision tree is shown. In FIG. 7, a synchronization progress identification module (SCIM) 710 can receive a series of messages 700 that are configured to transmit information relevant to the current and prospective upload status of the designated content items. Thus, one or more of the synchronization content set characteristics described previously (see FIGS. 3 and 4) can be used to determine whether the current synchronization content set is associated with an anomalous or atypical condition 760 that may increase the likelihood of a delay in the upload and/or correspond to an increased likelihood of a prolonged synchronization session. The terms 'atypical condition' or 'anomalous condition' refer to any condition or circumstance that is associated with a substantial likelihood of a delayed upload/download or a delayed synchronization session.

For purposes of clarity, only four decision paths are depicted in the decision tree of FIG. 7. However, it should be understood that a variety of factors can be considered by the SCIM 710 to help determine whether the upload is associated with atypical condition(s). Furthermore, results based on values from two or more paths (e.g., a first path and a second path) may be combined to produce a determination of an atypical condition in cases where the value for only the first path or only the second path alone would not.

In FIG. 7, a first path 720 evaluates whether the upload speed is below some designated value, a second path 730 evaluates whether the duration of the upload is presently considered to be longer than standard, a third path 740 evaluates whether the upload is not progressing as expected, and a fourth path 750 evaluates whether the synchronization or synchronization client has experienced any interruptions, and if the duration and/or frequency of the interruptions is greater than a designated threshold value. In this example, where one or more of these paths indicates an issue with the upload, the SCIM 710 can determine that atypical condition(s) 760 are occurring or likely to occur. In one implementation, the system can then generate an estimate of how long the synchronization content set will take to complete the synchronization (see upload duration estimation module 770). Depending on the settings of the client application, the server can then proceed to send a notification 780 to the user or generate other messages or instructions.

Figure 8:
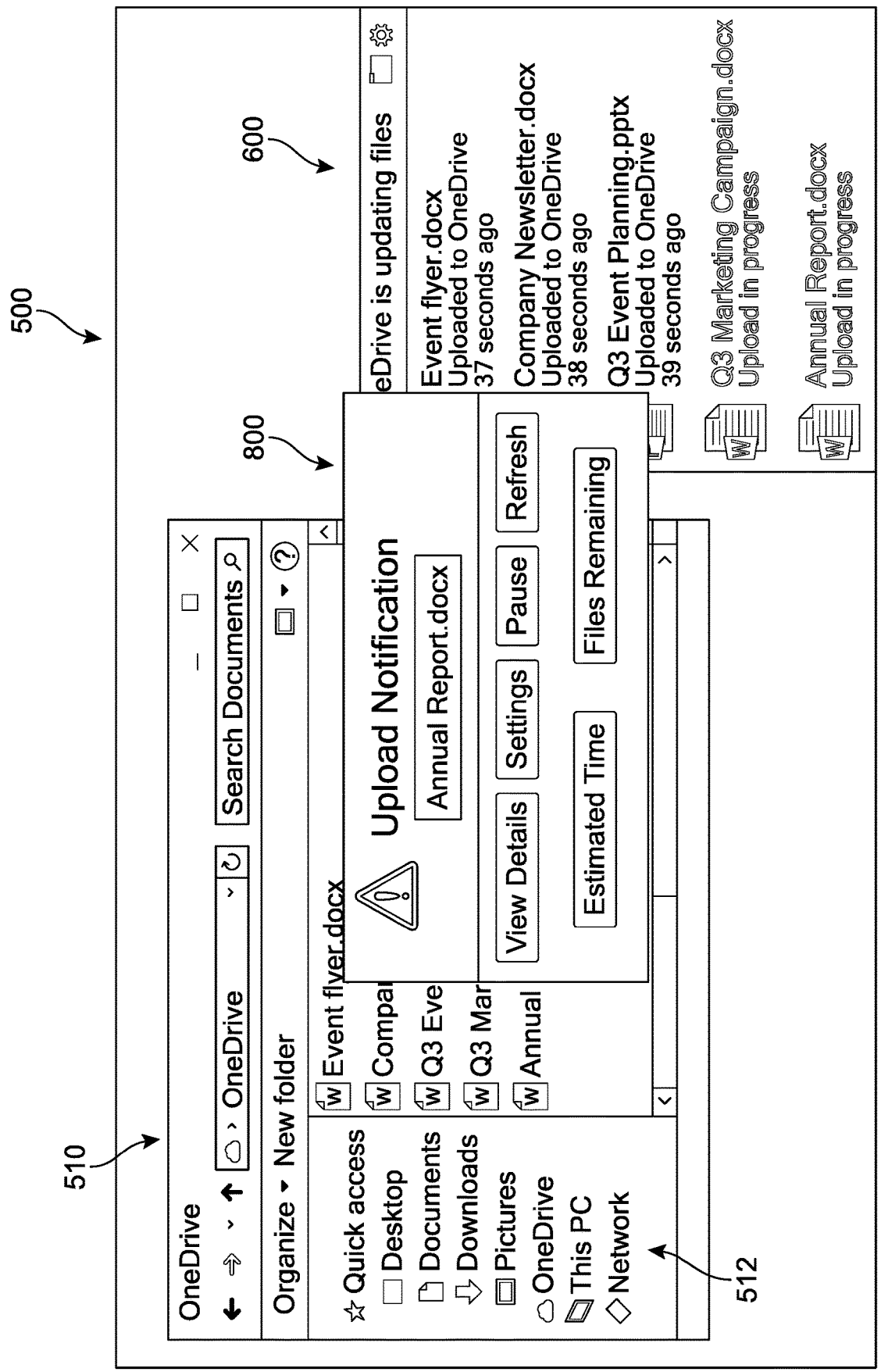
FIG. 8 is a representation of a device display with an implementation of a notification of an atypical synchronization condition.

In some implementations, the notification 780 can be generated automatically and delivered by e-mail and/or by any of the upload service endpoints (synchronization client messaging, text message, mobile device alert, app notification, automated phone call, web browser communication, etc.). In some implementations, the notification 780 may include information such as the current upload speed and/or an estimation of when the upload should be completed. The notification can help users identify potential data loss conditions, where the user might incorrectly assume that an upload to the cloud has been successful. FIG. 8 is one example of a notification 800 being presented to the user via device display 500 that informs a user of a potential delay in the synchronization of the files in the synchronization content set. In FIG. 8, the notification 800 is a floating dialog window, but it can be appreciated that in other implementations can include any other type of notification UI such as a pop-up window, a floating menu, a dialog box or callout, a window or drop-down extending from a desktop or application menu, or any other application communication or presentation means.

The notification 800 includes a general message 810 ("Upload Notification") and a plurality of options 850. In some implementations, the notification 800 can also include an indication of which portion of the synchronization content set is associated with the atypical condition, if there is a particular portion that has been determined to be causing the delay (see a file identification 820).

In this example, the options 850 illustrated include a first option 852 ("View Details") which can offer additional information about the delay or atypical condition causing the delay, and/or suggestions of how to minimize the delay or safeguard the data, as well as a second option 854 ("Settings") through which a user can adjust the various thresholds associated with triggering conditions (see FIG. 7), change the type or frequency of a notification, or modify other related features as preferred. A third option 856 ("Pause") can offer a shortcut to instruct the system to pause the synchronization, and a fourth option 858 ("Refresh") can submit a request to reset or reinitialize the synchronization and current status information. Furthermore, a fifth option 860 ("Estimated Time") can be selected to display the estimated remaining duration of the synchronization, and a sixth option 862 ("Files Remaining") can indicate the number and/or name of content items that have yet to be synchronized.

In other implementations, the notification 800 can be more succinct and simply alert the user with a message displaying the estimated time for the longer-than-normal syncing and/or requesting that the user keep the device in an 'on' state until the synchronization is completed. In another example, the notification 800 can present a description of the anomalous or atypical condition and suggest steps or actions that may be taken by the user to facilitate the synchronization, such as leaving the device on throughout the night or other user 'downtime', ensuring that the process is not paused, removing or reducing any upload rate restrictions, and/or moving the device to a location where a faster network is available, etc. In some implementations, the notification 800 can provide a warning to a user to refrain from re-imaging of the device or other actions that might compromise or delete the data while their device continues to be out-of-sync. As another example, the notification 800 can indicate that the synchronization client progress is lower than expected or lower than a designated threshold value, and/or offer the user the opportunity to troubleshoot the issue with a service provider-based Help or Support tutorial or walkthrough.

The system may also be configured to respond when a determination that an atypical condition has occurred via a mechanism other than generation of user notifications. In some cases, the CMS can instead or additionally respond with an automatic intervention to the operating system of the client device. As a first example, in some implementations, the CMS can automatically initiate a client-side diagnostic to test client device bandwidth, data transfer routes being used, and other such factors. This type of response can allow the system to quickly and unobtrusively further investigate and determine whether the issue(s) are readily solved by either the service provider or the user. The information collected via the diagnostic can also be used to improve upload duration in later synchronization events.

As another example, depending on the synchronization content set characteristics triggering the determination, a signal or instructions may be automatically transmitted to the synchronization client that initiates a (forced) restart of the synchronization client, thereby clearing the cause of the sync delay, and returning the synchronization to the speed that would have otherwise been expected. As a third example, which may also dependent on the synchronization content set characteristics triggering the determination, a message may be automatically sent to the synchronization client instructing the client device to switch to a mode in which the synchronization client is permitted to access and use additional computing resources of the client device, thereby increasing upload speed. In other words, the client device may reallocate its processor utilization to facilitate the upload of content items. Thus, while the operating system may run relatively slower for other computing activities, the synchronization will be completed sooner. Furthermore, in some implementations, a signal may be automatically transmitted by the service to prevent or block any updates, restorations, and/or refreshes to the client device while the synchronization is pending. In another example, the transmitted signal can be configured prevent the synchronization client from closing while the synchronization is in progress. In addition, in some cases, the service can automatically transmit a signal that is configured to search for faster connections that are available to the client device and switch networks if possible, or request that the user do so. In one implementation, the service can initiate a dynamic shifting of the bandwidth to accommodate the individual file sizes or entire synchronization content sets. Thus, as larger or bulkier files begin to sync, the bandwidth can be increased, and as smaller files are synced, the bandwidth can be decreased. Similarly, if a large number of files are to be synchronized, the bandwidth can be increased, while a small number of content items designated for synchronization can be associated with no change of bandwidth, or a decrease in bandwidth.

In addition, in some other implementations, the system may generate responses that more directly engage with the synchronization process. Referring to FIG. 9, it can be seen that in one implementation, the CMS can send a message to the synchronization client to re-order content items based on attributes of the synchronization content set. Some examples of such attributes include time of the last update for and/or modification of a particular content item(s) in the set, item size(s), and item type(s). In other implementations, any of the attributes described above with reference to previous figures can be used.

An example is shown in FIGS. 9A and 9B, where a smaller and/or more recently created or modified file of a first type is depicted as being moved forward automatically in an upload queue, such that it 'skips' or jumps ahead of an older, larger file of a second type that is also queued for upload in the synchronization content set. Referring to FIG. 9A, an upload queue 950 is ordered such that a first file 910 is scheduled or arranged to be uploaded before a second file 920. The first file 910 is significantly larger than the second file 920. In the lower sequence shown in FIG. 9B, the 'priority' associated with the second file 920 has been modified to better accommodate the synchronization content set characteristics identified by the system.

In different implementations, the first file 910 can be larger in size or can be otherwise associated with delays in synchronization. As a specific example, the second file 920 may be a small (~10 MB), recently written PowerPoint® file that has been moved forward automatically in the upload queue 950, such that it has 'skipped' or jumped ahead of a two-day-old, 1 GB video file (first file 910) that is also queued for upload in the synchronization content set. The reprioritization of the content item queue in the synchronization content set can be an automated mechanism by which the CMS can enable the swift backup of content items which would otherwise remain pending in a substantially static or slowed queue. Thus, rather than requiring these smaller content items to await the completion of a successful upload of larger or problematic content item(s) that have been flagged or otherwise determined to be associated with an upload delay, the queue can be updated to increase efficiency and synchronize the smaller content items with minimal or no delay, ahead of the portion associated with atypical characteristics. In some cases, managing the upload queue may further include pausing and un-pausing the upload queue based on identification of an atypical condition and a corresponding synchronization delay, and/or permitting users to reprioritize the queue if certain files are deemed to take precedence.

Thus, in different implementations, the client device can include provisions to (re)prioritize the content items queued for synchronization to the content management system in order to optimize the upload process and maximize the protection of the greatest number of content items. A content item can be prioritized in the queue based on its relative size, relative file type, relative synchronization status, and/or time of creation. Other factors may also play a role in determining whether content items should be reordered, including but not limited to the identification of content for work (rather than personal documents or other classification), the proportion of changes made to data comprising the revised content item relative to another content item that has been minimally revised, and/or whether the content item has been tagged as having high importance, etc.

Thus, in some implementations, if the synchronization content set characteristics conveyed to the cloud service indicate that one or more of the content items are disproportionately larger in size relative to one or more other content items, the smaller content item(s) can be reprioritized, and can be automatically moved or repositioned to synchronize prior to the larger file(s). In some implementations, this mechanism can be configured to automatically assign the smaller and/or more recently created content items higher priority, thereby ensuring that they will be synchronized as quickly as possible, while the larger content items are uploaded after the successful synchronization of the smaller content items. As one example, the service may include an algorithm or machine learning model configured to automatically re-order items either based on size, or history of synchronization reliability.

In different implementations, it can be appreciated that two or more synchronization sessions may occur simultaneously. In other words, a first synchronization content set ("first set") may be designated or identified for synchronization and data associated with the first set's content items can begin to be transferred from the client device to the cloud storage service. A second synchronization content set ("second set") can be also be concurrently designated for synchronization, and data associated with the second set's content items can begin to be transferred. Thus, portions of content from a first synchronization content set and a second synchronization content set may overlap or sync during or around the same period of time. In some implementations, the CMS can be configured to receive two or more synchronization content messages, where each message carries or transmits information for each content set. In other implementations, content from two or more synchronization content sets may be merged to produce a collective synchronization content set, thereby allowing a single message (conveying information associated with the data of both content sets) to be transmitted to the cloud storage service.

In other implementations, there may be data transfer for content occurring in a bidirectional manner. For example, data for a first content set may be uploaded while data for a second content set may be downloaded. The CMS can be configured to receive messages about both content sets and continue to detect whether an atypical condition is present and determine the likelihood of a prolonged synchronization for each content set. In addition, in one implementation, in response to the determination that the synchronization has a likelihood of being prolonged, the bandwidth for content being uploaded can be increased (for example, by a corresponding decrease in the bandwidth for content being downloaded), thereby prioritizing back-up of content items on the client device.

Figure 10:
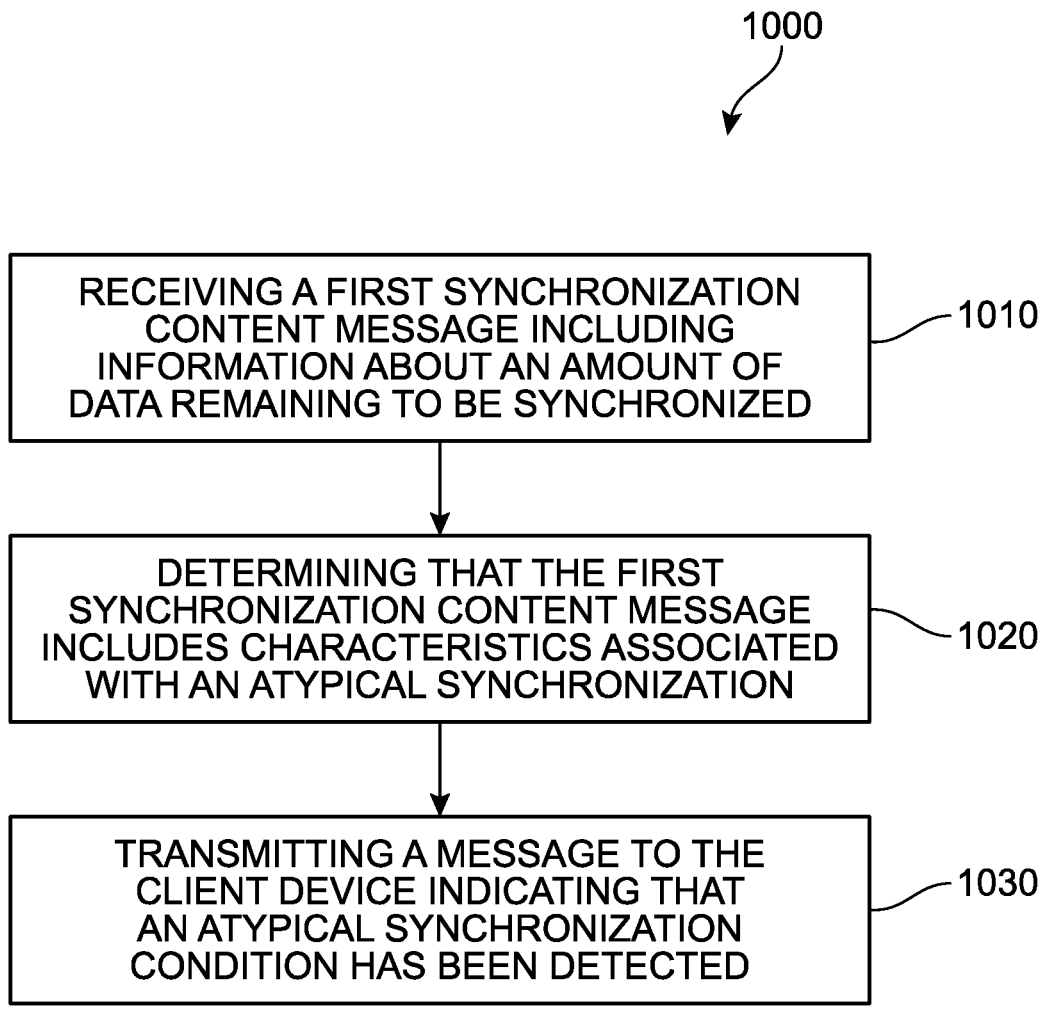
FIG. 10 is a flow diagram illustrating an implementation of a process for detecting atypical synchronization conditions.

FIG. 10 is a flow chart illustrating an implementation of a method 1000 of determining if a prolonged synchronization is likely. In the example of FIG. 10, a first step 1010 includes receiving, for example from a client device over a communication network, at least a first synchronization content message. The first synchronization content message can be understood to include or convey progress of a synchronization of a first synchronization content set, where the first synchronization content set includes one or more electronic content items. In one implementation, the first synchronization content message includes information about an amount of data remaining to be synchronized. A second step 1020 includes determining that a synchronization of the first synchronization content set has a likelihood of being prolonged. In some implementations, this determination can be based at least in part on detection of an atypical synchronization condition being associated with the information provided in the first synchronization content message. A third step 1030 include transmitting a first message to the client device indicating that the synchronization of the first synchronization content set has a likelihood of being prolonged.

In other implementations, additional steps may be included. For example, in some implementations, the determination that the synchronization of the first synchronization content set has a likelihood of being prolonged is made based on a comparison with a standard synchronization duration obtained at least in part by reference to previous synchronization events for the client device, or devices associated with the user and/or the user account. In some implementations, the standard synchronization duration can be obtained at least in part by reference to previous synchronization events associated or occurring at devices that are identified or otherwise determined to be similar to the client device, for example in configuration, network, processor, and/or other aspects. In another implementation, the determination that the synchronization of the first synchronization content set has a likelihood of being prolonged is made based on a comparison with a standard synchronization duration obtained at least in part by reference to previous synchronization events for a plurality of users of a synchronization service. In some cases, the first synchronization content message further includes information about a network speed for the client device, and/or the first synchronization content message further includes information about a number of electronic content items remaining to be synchronized, where the determination that the synchronization has a likelihood of being prolonged is further based on the number of electronic content items remaining to be synchronized.

In addition, in some implementations, the method can further include a step of receiving sequence information for the synchronization, where the sequence information identifies a sequence in which each electronic content item in the first synchronization content set are scheduled to be synchronized relative to one another, and the sequence information indicates that a first content item of the first synchronization content set will be synchronized prior to a second content item of the first synchronization content set. The method may also include ascertaining that the first content item has a substantially greater size than the second content item, and automatically reordering the sequence in which the electronic content items are scheduled to be synchronized such that the second content item is scheduled for synchronization before the first content item is scheduled to be synchronized.

Other implementations of the method include automatically initiating a restart of the client device, and/or detecting network connections available to the client device and automatically switching the client device from a first network connection to a relatively faster second network connection. These can occur in response to the determination that the synchronization has a likelihood of being prolonged.

In another example, the method can further include receiving a signal indicating an imminent shutdown of the client device, automatically preventing the shutdown of the client device, and transmitting a second message to the client device advising a postponement of the shutdown of the client device pending completion of the synchronization. In some implementations, the method may include receiving a signal indicating an imminent change in power state of the client device, and automatically interrupting the change in power state in response to the determination that the synchronization has a likelihood of being prolonged, thereby preventing the client device from entering a suspended state or a power-off state. In addition, in some cases, the synchronization content message can include information about the time of day for the client device, and the server may transmit for display to the user a notification or user element that advises, recommends, or requests that the client device be left in a powered-on state that permits the synchronization to continue overnight in response to the determination that the synchronization has a likelihood of being prolonged.

In some implementations, the method can include automatically initiating a diagnostic tool on the client device to determine possible causes of the prolonged synchronization in response to the determination that the synchronization has a likelihood of being prolonged, and/or automatically reallocating computing resources of the client device such that computing resources being utilized for the synchronization are increased in response to the determination that the synchronization has a likelihood of being prolonged, thereby reducing a projected duration for the synchronization.

As noted previously, the ability to provide users a mechanism by which to better manage synchronization of electronic content can significantly improve workflow efficiency and protect user data. By detecting situations that can lead to potential data loss, users can take actions that can better safeguard content items. Through the use of this system, users can continue to reliably access and maintain the most recent versions of their electronic content from different devices, despite atypical synchronization conditions. In addition, by providing users with notifications in response to a determination of atypical condition(s), users are provided an opportunity to remain abreast of the status of their electronic content, particularly in situations where the user might otherwise have remained unaware of the prolonged duration required for synchronization. This type of content management system can help a user feel more confident in the security and access of their electronic content, and/or reduce the possibility of their experiencing loss of data.

The detailed examples of systems, devices, and techniques described in connection with FIGS. 1-10 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-10 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 11:
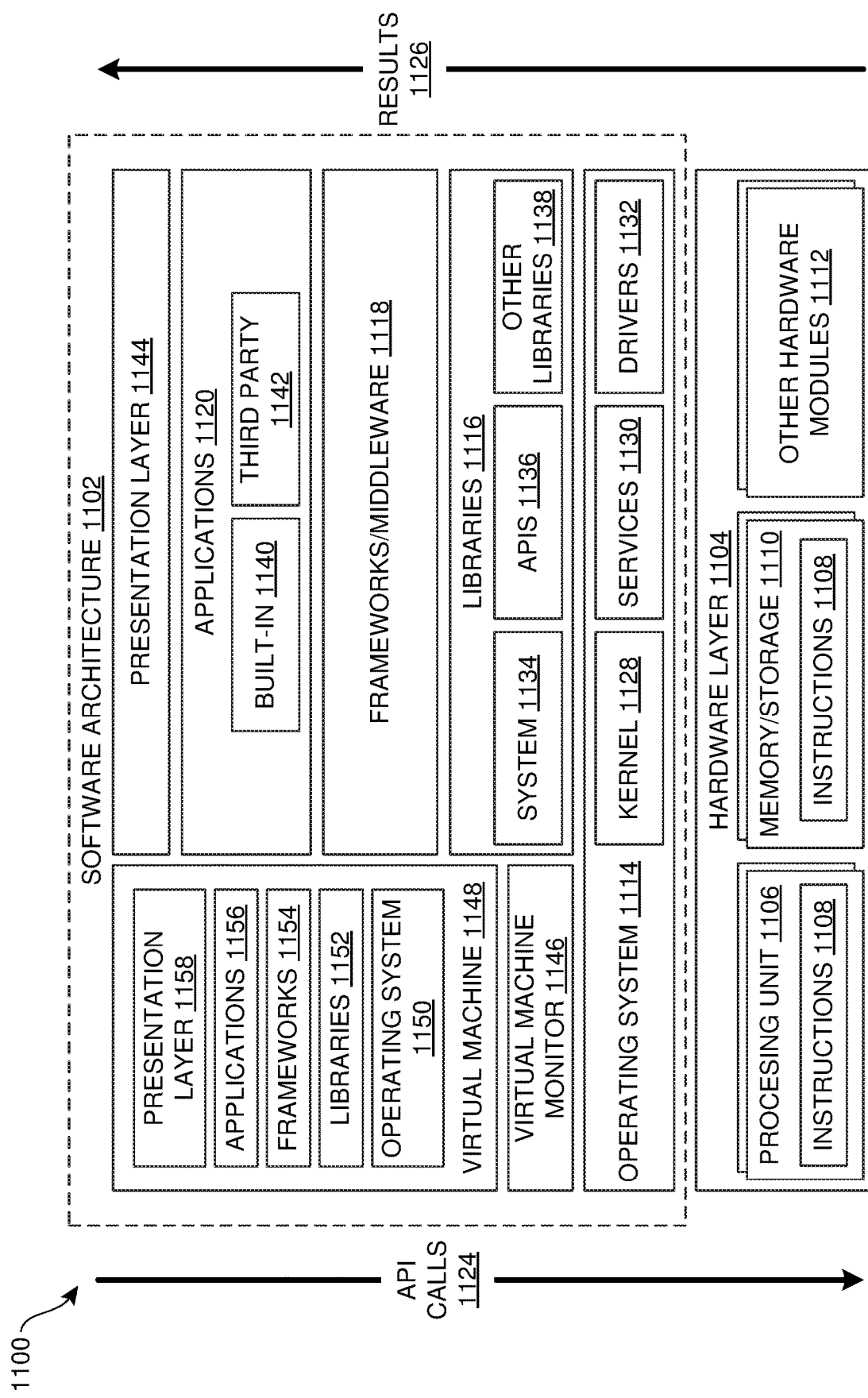
FIG. 11 is a block diagram of an example computing device, which may be used to provide implementations of the mechanisms described herein.

FIG. 11 is a block diagram 1100 illustrating an example software architecture 1102, various portions of which may be used in conjunction with various hardware architectures herein described, which may implement any of the above-described features. FIG. 11 is a non-limiting example of a software architecture and it will be appreciated that many other architectures may be implemented to facilitate the functionality described herein. The software architecture 1102 may execute on hardware such as a device 120 of FIG. 1A that includes, among other things, document storage 1070, processors, memory, and input/output (I/O) components. A representative hardware layer 1104 is illustrated and can represent, for example, the device 120 of FIG. 1. The representative hardware layer 1104 includes a processing unit 1106 and associated executable instructions 1108. The executable instructions 1108 represent executable instructions of the software architecture 1102, including implementation of the methods, modules and so forth described herein. The hardware layer 1104 also includes a memory/storage 1110, which also includes the executable instructions 1108 and accompanying data. The hardware layer 1104 may also include other hardware modules 1112. Instructions 1108 held by processing unit 1108 may be portions of instructions 1108 held by the memory/storage 1110.

The example software architecture 1102 may be conceptualized as layers, each providing various functionality. For example, the software architecture 1102 may include layers and components such as an operating system (OS) 1114, libraries 1116, frameworks 1118, applications 1120, and a presentation layer 1144. Operationally, the applications 1120 and/or other components within the layers may invoke API calls 1124 to other layers and receive corresponding results 1126. The layers illustrated are representative in nature and other software architectures may include additional or different layers. For example, some mobile or special purpose operating systems may not provide the frameworks/middleware 1118.

The OS 1114 may manage hardware resources and provide common services. The OS 1114 may include, for example, a kernel 1128, services 1130, and drivers 1132. The kernel 1128 may act as an abstraction layer between the hardware layer 1104 and other software layers. For example, the kernel 1128 may be responsible for memory management, processor management (for example, scheduling), component management, networking, security settings, and so on. The services 1130 may provide other common services for the other software layers. The drivers 1132 may be responsible for controlling or interfacing with the underlying hardware layer 1104. For instance, the drivers 1132 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1116 may provide a common infrastructure that may be used by the applications 1120 and/or other components and/or layers. The libraries 1116 typically provide functionality for use by other software modules to perform tasks, rather than rather than interacting directly with the OS 1114. The libraries 1116 may include system libraries 1134 (for example, C standard library) that may provide functions such as memory allocation, string manipulation, file operations. In addition, the libraries 1116 may include API libraries 1136 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1116 may also include a wide variety of other libraries 1138 to provide many functions for applications 1120 and other software modules.

The frameworks 1118 (also sometimes referred to as middleware) provide a higher-level common infrastructure that may be used by the applications 1120 and/or other software modules. For example, the frameworks 1118 may provide various graphic user interface (GUI) functions, high-level resource management, or high-level location services. The frameworks 1118 may provide a broad spectrum of other APIs for applications 1120 and/or other software modules.

The applications 1120 include built-in applications 1140 and/or third-party applications 1142. Examples of built-in applications 1140 may include, but are not limited to, a contacts application, a browser application, a location application, a media application, a messaging application, and/or a game application. Third-party applications 1142 may include any applications developed by an entity other than the vendor of the particular platform. The applications 1120 may use functions available via OS 1114, libraries 1116, frameworks 1118, and presentation layer 1144 to create user interfaces to interact with users.

Some software architectures use virtual machines, as illustrated by a virtual machine 1148. The virtual machine 1148 provides an execution environment where applications/modules can execute as if they were executing on a hardware machine (such as the machine 1000 of FIG. 10, for example). The virtual machine 1148 may be hosted by a host OS (for example, OS 1114) or hypervisor, and may have a virtual machine monitor 1146 which manages operation of the virtual machine 1148 and interoperation with the host operating system. A software architecture, which may be different from software architecture 1102 outside of the virtual machine, executes within the virtual machine 1148 such as an OS 1150, libraries 1152, frameworks 1154, applications 1156, and/or a presentation layer 1158.

Figure 12:
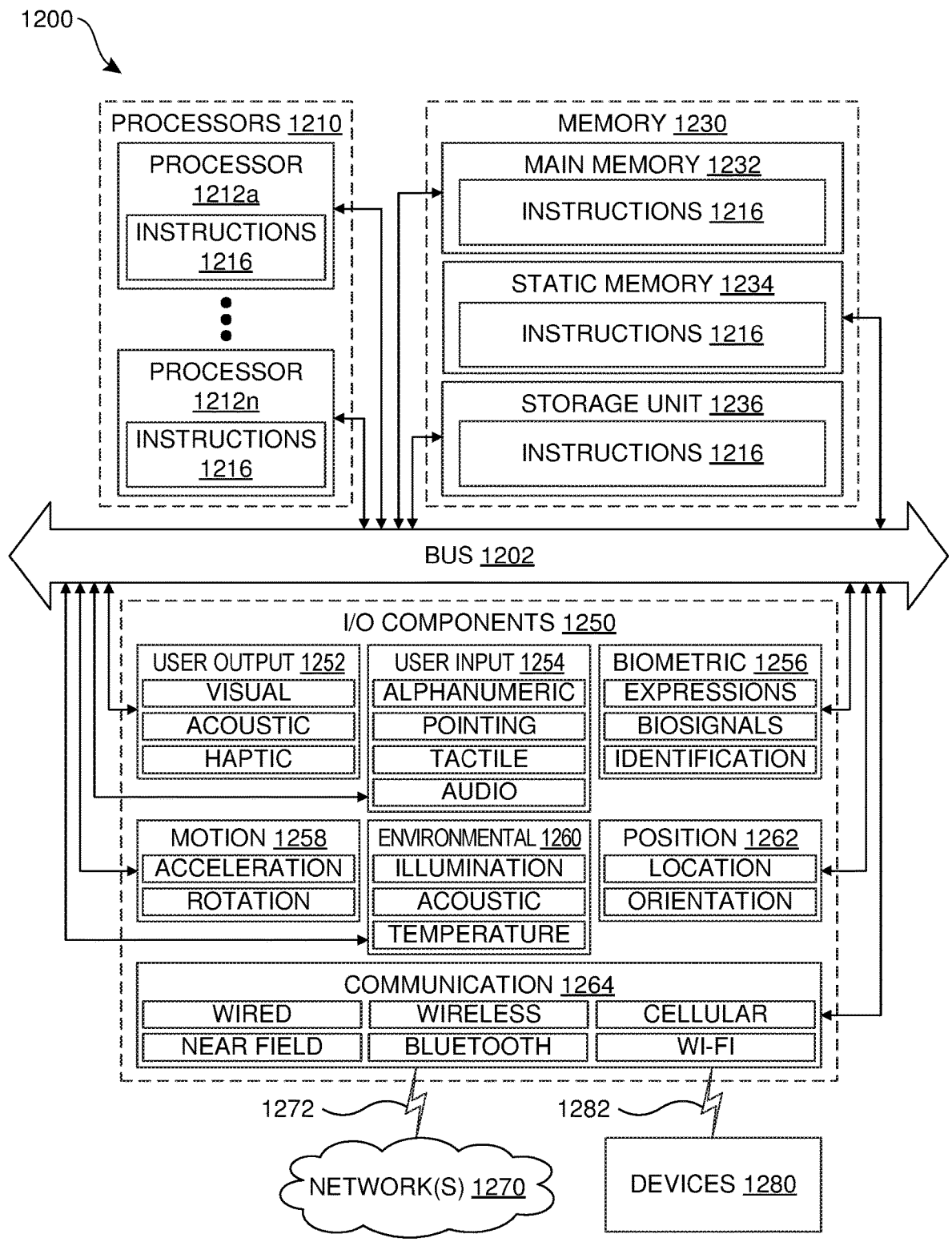
FIG. 12 is a block diagram illustrating components of an example machine configured to read instructions from a machine-readable medium.

FIG. 12 is a block diagram illustrating components of an example machine 1200 configured to read instructions from a machine-readable medium (for example, a machine-readable storage medium) and perform any of the features described herein. The example machine 1200 is in a form of a computer system, within which instructions 1216 (for example, in the form of software components) for causing the machine 1200 to perform any of the features described herein may be executed. As such, the instructions 1216 may be used to implement modules or components described herein. The instructions 1216 cause unprogrammed and/or unconfigured machine 1200 to operate as a particular machine configured to carry out the described features. The machine 1200 may be configured to operate as a standalone device or may be coupled (for example, networked) to other machines. In a networked deployment, the machine 1200 may operate in the capacity of a server machine or a client machine in a server-client network environment, or as a node in a peer-to-peer or distributed network environment. Machine 1200 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1200 is illustrated, the term "machine" include a collection of machines that individually or jointly execute the instructions 1216.

The machine 1200 may include processors 1210, memory 1230, and I/O components 1250, which may be communicatively coupled via, for example, a bus 1202. The bus 1202 may include multiple buses coupling various elements of machine 1200 via various bus technologies and protocols. In an example, the processors 1210 (including, for example, a central processing unit (CPU), a graphics processing unit (GPU), a digital signal processor (DSP), an ASIC, or a suitable combination thereof) may include one or more processors 1212a to 1212n that may execute the instructions 1216 and process data. In some examples, one or more processors 1210 may execute instructions provided or identified by one or more other processors 1210. The term "processor" includes a multi-core processor including cores that may execute instructions contemporaneously. Although FIG. 12 shows multiple processors, the machine 1200 may include a single processor with a single core, a single processor with multiple cores (for example, a multi-core processor), multiple processors each with a single core, multiple processors each with multiple cores, or any combination thereof. In some examples, the machine 1200 may include multiple processors distributed among multiple machines.

The memory/storage 1230 may include a main memory 1232, a static memory 1234, or other memory, and a storage unit 1236, both accessible to the processors 1210 such as via the bus 1202. The storage unit 1236 and memory 1232, 1234 store instructions 1216 embodying any one or more of the functions described herein. The memory/storage 1230 may also store temporary, intermediate, and/or long-term data for processors 1210. The instructions 1216 may also reside, completely or partially, within the memory 1232, 1234, within the storage unit 1236, within at least one of the processors 1210 (for example, within a command buffer or cache memory), within memory at least one of I/O components 1250, or any suitable combination thereof, during execution thereof. Accordingly, the memory 1232, 1234, the storage unit 1236, memory in processors 1210, and memory in I/O components 1250 are examples of machine-readable media.

As used herein, "machine-readable medium" refers to a device able to temporarily or permanently store instructions and data that cause machine 1200 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1216) for execution by a machine 1200 such that the instructions, when executed by one or more processors 1210 of the machine 1200, cause the machine 1200 to perform and one or more of the features described herein. Accordingly, a "machine-readable medium" may refer to a single storage device, as well as "cloud-based" storage systems or storage networks that include multiple storage apparatus or devices.

The I/O components 1250 may include a wide variety of hardware components adapted to receive input, provide output, produce output, transmit information, exchange information, capture measurements, and so on. The specific I/O components 1250 included in a particular machine will depend on the type and/or function of the machine. For example, mobile devices such as mobile phones may include a touch input device, whereas a headless server or IoT device may not include such a touch input device. The particular examples of I/O components illustrated in FIG. 12 are in no way limiting, and other types of components may be included in machine 1200. The grouping of I/O components 1250 are merely for simplifying this discussion, and the grouping is in no way limiting. In various examples, the I/O components 1250 may include user output components 1252 and user input components 1254. User output components 1252 may include, for example, display components for displaying information (for example, a liquid crystal display (LCD) or a projector), acoustic components (for example, speakers), haptic components (for example, a vibratory motor or force-feedback device), and/or other signal generators. User input components 1254 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1250 may include biometric components 1256 and/or position components 1262, among a wide array of other environmental sensor components. The biometric components 1256 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1262 may include, for example, location sensors (for example, a Global Position System (GPS) receiver), altitude sensors (for example, an air pressure sensor from which altitude may be derived), and/or orientation sensors (for example, magnetometers).

The I/O components 1250 may include communication components 1264, implementing a wide variety of technologies operable to couple the machine 1200 to network(s) 1270 and/or device(s) 1280 via respective communicative couplings 1272 and 1282. The communication components 1264 may include one or more network interface components or other suitable devices to interface with the network (s) 1270. The communication components 1264 may include, for example, components adapted to provide wired communication, wireless communication, cellular communication, Near Field Communication (NFC), Bluetooth communication, Wi-Fi, and/or communication via other modalities. The device(s) 1280 may include other machines or various peripheral devices (for example, coupled via USB).

In some examples, the communication components 1264 may detect identifiers or include components adapted to detect identifiers. For example, the communication components 1264 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1262, such as, but not limited to, geo-location via Internet Protocol (IP) address, location via Wi-Fi, cellular, NFC, Bluetooth, or other wireless station identification and/or signal triangulation.

Furthermore, implementations of the present disclosure can make use of any of the features, systems, components, devices, and methods described in U.S. Pat. No. 7,181,531 to Pinkerton et al., issued Feb. 20, 2017 and titled "Method to synchronize and upload an offloaded network stack connection with a network stack,"; U.S. Patent Publication Number 2008/0005188 to Teodosiu et al., published Jan. 3, 2008 and titled "Content Synchronization in a File Sharing Environment,"; U.S. Patent Publication Number 20090300169 to Sagar et al., published Jan. 3, 2008 and titled "Synchronization throttling based on user activity,"; U.S. Patent Publication Number 20060080363 to Vadlamani et al., published Apr. 13, 2006 and titled "Synchronization for smart clients,"; U.S. Pat. No. 9,110,892 to Didcock et al., issued Aug. 18, 2015 Feb. 20, 2017 and titled "Synchronizing local and remote data,"; U.S. Patent Publication Number 20150112924 to Vanturennout et al., published Apr. 23, 2015 and titled "Data classification for adaptive synchronization, "; and U.S. Patent Publication Number 20140258703 to Vanturennout et al., published Sep. 11, 2014 and titled "Adaptive data synchronization," the disclosures of which are each herein incorporated by reference in their entirety.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A content management system comprising:
one or more processors; and
one or more computer readable media including instructions which, when executed by the one or more processors, cause the one or more processors to:
receive, from a client device over a communication network, at least a first synchronization content message configured to convey progress of a synchronization of a first synchronization content set that includes at least a first electronic content item, where the first synchronization content message includes information about an amount of data remaining to be synchronized;
determine that a synchronization of the first synchronization content set has a likelihood of being prolonged compared to a reference duration based on previous synchronization events with the client device, the determination based at least in part on detection of an atypical synchronization condition being associated with the information of the first synchronization content message; and
transmit, over the communication network to the client device, a first message indicating that the synchronization of the first synchronization content set has a likelihood of being prolonged.

2. The system of claim 1, wherein the instructions further cause the one or more processors to:
receive sequence information for the synchronization via the first synchronization content message, the sequence information identifying a sequence in which each electronic content item in the first synchronization content set are scheduled to be synchronized relative to one another based on an order in which each electronic content item is added to a synchronization queue, the sequence information indicating that the first content item of the first synchronization content set will be synchronized prior to a second content item of the first synchronization content set; and
automatically reorder the sequence in which the electronic content items are placed in the synchronization queue such that the second content item is scheduled to be synchronized before the first content item is scheduled to be synchronized based at least in part on a first history of synchronization reliability associated with the first content item and a second history of synchronization reliability associated with the second content item.

3. The system of claim 1, wherein the instructions further cause the one or more processors to:
receive a signal indicating an imminent change in power state of the client device; and
automatically interrupt the change in power state in response to the determination that the synchronization has a likelihood of being prolonged, thereby preventing the client device from entering a suspended state or a power-off state.

4. The system of claim 1, wherein the instructions further cause the one or more processors to send a second message to the client device comprising a command to cause the client device to reallocate computing resources of the client device such that computing resources being utilized for the synchronization are increased in response to the determination that the synchronization has a likelihood of being prolonged, thereby reducing a projected duration for the synchronization.

5. The system of claim 1, wherein the determination that the synchronization of the first synchronization content set has a likelihood of being prolonged is made based on a comparison with a standard synchronization duration obtained at least in part by reference to previous synchronization events for the client device.

6. The content management system of claim 1, wherein the reference duration is obtained at least in part by reference to previous synchronization events associated with a plurality of devices similar to the client device.

7. The content management system of claim 1, wherein the reference duration is obtained at least in part by reference to previous synchronization events associated with a plurality of users of the content management system.

8. A content management system comprising:
a synchronization content set tracking module configured to receive, from a client device over a communication network, at least a first synchronization content message configured to convey progress of a synchronization of a first synchronization content set including at least one electronic content item, where the first synchronization content message includes information about an amount of data remaining to be synchronized; and
a synchronization condition manager configured to:
determine that a synchronization of the first synchronization content set has a likelihood of being prolonged compared to a reference duration based on previous synchronization events with the client device, the determination based at least in part on detection of an atypical synchronization condition being associated with the information of the first synchronization content message, and
transmit a synchronization condition message over the communication network to the client device indicating that the synchronization of the first synchronization content set has a likelihood of being prolonged.

9. The system of claim 8, further comprising a standard synchronization duration calculator configured to provide a standard synchronization duration based at least in part by reference to previous synchronization events for the client device,
wherein the synchronization condition manager is configured to determine that the synchronization of the first synchronization content set has a likelihood of being prolonged is made based on a comparison with the standard synchronization duration.

10. The system of claim 8, wherein the system is further configured to send a second message to the client device comprising a command to cause the client device to reallocate computing resources of the client device such that computing resources being utilized for the synchronization are increased in response to the determination that the synchronization has a likelihood of being prolonged, thereby reducing a projected duration for the synchronization.

11. The system of claim 8, wherein the system is further configured to automatically:
receive a signal indicating an imminent change in power state of the client device; and
interrupt the change in power state in response to the determination that the synchronization has a likelihood of being prolonged, thereby preventing the client device from entering a suspended state or a power-off state.

12. A method comprising:
receiving, from a client device over a communication network, at least a first synchronization content message configured to convey progress of a synchronization of a first synchronization content set that includes at least a first electronic content item, where the first synchronization content message includes information about an amount of data remaining to be synchronized;
determining that a synchronization of the first synchronization content set has a likelihood of being prolonged compared to a reference duration based on previous synchronization events with the client device, the determination based at least in part on detection of an atypical synchronization condition being associated with the information of the first synchronization content message; and
transmitting a first message over the communication network to the client device indicating that the synchronization of the first synchronization content set has a likelihood of being prolonged.

13. The method of claim 12, wherein the determination that the synchronization of the first synchronization content set has a likelihood of being prolonged is made based on a comparison with a standard synchronization duration obtained at least in part by reference to previous synchronization events for the client device.

14. The method of claim 12, wherein the determination that the synchronization of the first synchronization content set has a likelihood of being prolonged is made based on a comparison with a standard synchronization duration obtained at least in part by reference to previous synchronization events for a plurality of users of a synchronization service.

15. The method of claim 12, wherein the first synchronization content message further includes information about a network speed for the client device.

16. The method of claim 15, further comprising detecting network connections available to the client device and automatically switching the client device from a first network connection to a relatively faster second network connection in response to the determination that the synchronization has a likelihood of being prolonged.

17. The method of claim 12, wherein:
the first synchronization content message further includes information about a number of electronic content items remaining to be synchronized; and
the determination that the synchronization has a likelihood of being prolonged is further based on the number of electronic content items remaining to be synchronized.

18. The method of claim 12, further comprising:
receiving sequence information for the synchronization, the sequence information identifying an order in which each electronic content item in the first synchronization content set are scheduled to be synchronized relative to one another based on an order in which each electronic content item is added to a synchronization queue, the sequence information indicating that the first content item of the first synchronization content set will be synchronized prior to a second content item of the first synchronization content set; and
automatically reordering the order in which the electronic content items are placed in the synchronization queue such that the second content item is scheduled to be synchronized before the first content item is scheduled to be synchronized based at least in part on a first history of synchronization reliability associated with the first content item and a second history of synchronization reliability associated with the second content item.

19. The method of claim 12, further comprising automatically initiating a restart of the client device in response to the determination that the synchronization has a likelihood of being prolonged.

20. The method of claim 12, further comprising:
receiving a signal indicating an imminent change in power state of the client device; and
automatically interrupting the change in power state in response to the determination that the synchronization has a likelihood of being prolonged, thereby preventing the client device from entering a suspended state or a power-off state.

21. The method of claim 12, further comprising sending a second message to the client device comprising a command to cause the client device to initiate a diagnostic tool on the client device to determine possible causes of the prolonged synchronization in response to the determination that the synchronization has a likelihood of being prolonged.

22. The method of claim 12, further comprising sending a second message to the client device comprising a command to cause the client device to reallocate computing resources of the client device such that computing resources being utilized for the synchronization are increased in response to the determination that the synchronization has a likelihood of being prolonged, thereby reducing a projected duration for the synchronization.

\* \* \* \* \*